United States Patent
Croxford

(10) Patent No.: US 11,093,168 B2
(45) Date of Patent: Aug. 17, 2021

(54) PROCESSING OF NEURAL NETWORKS ON ELECTRONIC DEVICES

(71) Applicant: Apical Limited, Cambridge (GB)

(72) Inventor: Daren Croxford, Swaffham Prior (GB)

(73) Assignee: Apical Limited, Cambridge (GB)

(*) Notice: Subject to any disclaimer, the term of this patent is extended or adjusted under 35 U.S.C. 154(b) by 97 days.

(21) Appl. No.: 16/120,682

(22) Filed: Sep. 4, 2018

(65) Prior Publication Data

US 2020/0073581 A1  Mar. 5, 2020

(51) Int. Cl.
*G06F 3/00* (2006.01)
*G06F 3/06* (2006.01)
*G06N 3/10* (2006.01)
*G06N 3/04* (2006.01)

(52) U.S. Cl.
CPC .......... *G06F 3/0655* (2013.01); *G06F 3/0604* (2013.01); *G06F 3/0673* (2013.01); *G06N 3/04* (2013.01); *G06N 3/10* (2013.01)

(58) Field of Classification Search
None
See application file for complete search history.

(56) References Cited

U.S. PATENT DOCUMENTS

| 7,526,463 B2 * | 4/2009 | Collette, III | G05B 13/027 706/23 |
| 8,988,443 B2 | 3/2015 | Croxford et al. | |
| 9,406,155 B2 | 8/2016 | Oterhals et al. | |
| 9,881,401 B2 * | 1/2018 | Oterhals | G06T 11/40 |
| 2017/0024158 A1 | 1/2017 | Brkic et al. | |
| 2019/0362155 A1 * | 11/2019 | Croxford | G06K 9/66 |

* cited by examiner

*Primary Examiner* — Midys Rojas
(74) *Attorney, Agent, or Firm* — Nixon & Vanderhye P.C.

(57) ABSTRACT

A data processing system comprising a processor operable to execute a neural network, and associated methods for operating data processing systems. The data processing system comprises the processor and a memory for storing data relating to neural network processing being performed by the processor. The data processor is operable to write to the memory and to read from the memory blocks of data corresponding to regions of a data array generated by the neural network. The writing (or reading) is performed based on a signature comparison between the block of data that is to be written to (or read from) memory and a block of data that is already stored in memory.

18 Claims, 13 Drawing Sheets

PROCESSING OF NEURAL NETWORKS ON ELECTRONIC DEVICES

BACKGROUND

The technology described herein relates to the processing of neural networks on electronic devices, and in particular the use of neural networks on lower powered and portable electronic devices, such as phones or tablets.

Neural networks can be used for processes such as machine learning, computer vision, and natural language processing operations. It is becoming increasingly common for neural networks to be employed on portable electronic devices, such as mobile phones, tablets, and other devices for these purposes.

Neural networks generally comprise a number of layers which each process an input data array to provide an output data array (which becomes the input data array for the next layer). The layers, acting one after the other, may be able to process complex data (e.g. image or sound data) to ultimately provide a desired output (e.g. an identification of an object within an image, or a spoken word within a sound clip, or other useful output inferred from the input data). This process is usually known as "inferencing" or "classification".

The data arrays processed and produced by the layers of a neural network may comprise large amounts of data. This can result in relatively large memory transactions being required, for example in relation to outputting data arrays produced by one or more of layers of the neural network to memory, and then reloading those data arrays (e.g. for use by subsequent layers). For example, data arrays produced and used by a neural network may frequently be too large to be retained in their entirety in local on-chip storage, such that a data array may have to be output to main memory. Subsequent processing by a subsequent layer of the neural network may require a data array that has been output to main memory to be read back in to local memory.

Hence, executing a neural network may typically involve a large amount of data being transferred to and from main memory. This increases the power consumption, processing burden, memory requirements, and memory bandwidth usage within a device that is implementing the neural network. This can particularly be an issue in the case of lower power and portable electronic devices, where processing and storage resources may be more constrained.

The Applicants accordingly believe that there remains scope for improvements to the processing of neural networks on electronic devices, in particular to reduce power and bandwidth consumed when executing neural networks, particularly on portable devices.

BRIEF DESCRIPTION OF THE DRAWINGS

A number of embodiments of the technology described herein will now be described by way of example only and with reference to the accompanying drawings, in which:

FIG. 1 shows schematically a data processing system that the technology described herein may be used in;

FIG. 2 shows schematically an overview of a convolutional neural network (CNN) that the technology described herein may be used for;

DETAILED DESCRIPTION

Figure 1:
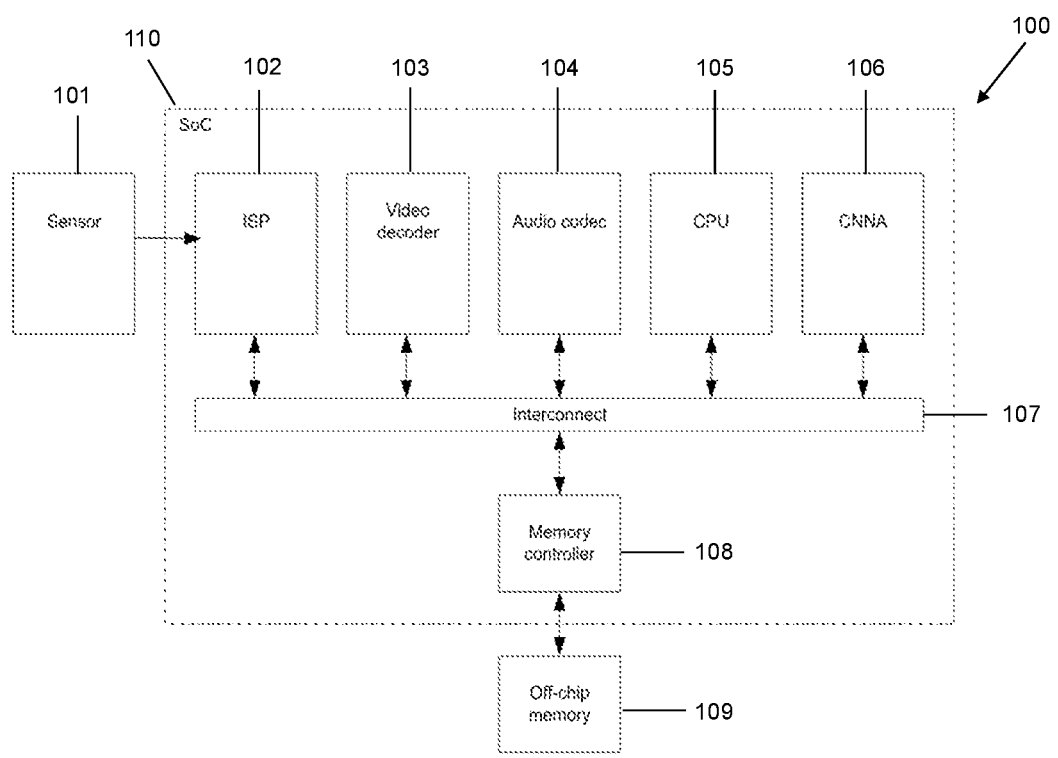

A first embodiment of the technology described herein comprises a method of operating a data processing system, the data processing system comprising a processor operable to execute a neural network, and memory for storing data relating to the neural network processing being performed by the processor; the method comprising:

when a data array generated by the neural network processing is to be written to the memory, the processor:
  writing the data array to the memory by writing blocks of data representing particular regions of the data array to the memory;
  the method further comprising the processor:
  when a block of data representing a region of the data array is to be written to memory, generating a signature representative of the content of the region of the data array that the block represents;
  comparing the signature for the block of data to a signature of a block of a data array that is already stored in memory; and
  determining whether or not to write the block of data to the memory on the basis of the signature comparison.

In another embodiment, the technology described herein comprises a data processing system, comprising:
  a processor operable to execute a neural network; and
  memory for storing data relating to neural network processing being performed by the processor;
  wherein the processor is operable to, when a data array generated by the neural network processing is to be written to the memory, write the data array to the memory by writing blocks of data representing particular regions of the data array to the memory; and
  the processor further comprising:
  signature generating circuitry operable to generate, for a block of data representing a region of a data array which is to be written to the memory, a signature representative of the content of the region of the data array that the block represents;
  comparison circuitry which is operable to, when a block of data representing a region of a data array is to be written to the memory:

compare a signature representative of the content of the region that the block of data represents to a signature representative of the content of a region that a block of a data array that is already stored in the memory represents; and determine whether or not to write the block of data to the memory on the basis of the signature comparison.

In the technology described herein, when a data array generated by a neural network is (desired) to be written to (main) memory, a signature representative of a block (region) of the data array is compared with a signature representative of a block (region) of a data array which is already stored in memory. The block of the data array is then stored in the memory or not on the basis of this signature comparison. As will be discussed further below, this facilitates avoiding, or omitting, writing data to memory if similar data has already been stored in memory (i.e. if the signature comparison indicates that the data blocks are sufficiently similar).

The Applicants have recognised in this regard that data arrays produced or generated by a neural network may comprise regions that are similar. For instance, if the data arrays are derived from image data containing a number of similar or repeated features or a large background, then regions of the data arrays derived from that image may also be similar. Alternatively, where the neural network is processing successive image frames, e.g. from video data, then regions of one frame may be similar to regions of a previous frame. The Applicants have further recognised that, when a region of a data array produced by the neural network is sufficiently similar to a region already stored in (main) memory, it is possible to avoid a memory write transaction relating to that region. Such elimination of write transactions can reduce the power and bandwidth consumed when operating a neural network, which is especially important for portable devices which generally have less processing and memory resources.

The technology described herein compares blocks of the data arrays (representing respective regions of data arrays). This facilitates the signature generation and comparison process (since a signature can be generated for a block representing a region of a data array). Furthermore, this block-based comparison is suited to use with data arrays in neural networks, since neural networks may generally be able to process data arrays on a "block-by-block" basis. For instance, the neural network may process a certain region (block) of an input data array to produce a corresponding region (block) of a data array generated by the neural network processing. Generally the processing for a certain region (block) of an input data array may be performed substantially independently from other regions (blocks) of the input data array, such that the neural network may generate a number of blocks (regions) which can be written to memory independently of one another (if desired). The Applicants have recognised that signatures may be generated for each block (region) that is generated, and so signature comparisons can be used to facilitate eliminating or avoiding memory writes on a "block-by-block" basis.

The "block" comparison of the technology described herein uses signatures representative of the contents of regions (blocks) of the data arrays. This simplifies and accelerates the comparison process. The Applicants have recognised in this regard that although a comparison using signatures may be less accurate than comparing the actual data for the regions (blocks) of the data arrays (since the signature is merely a representation of the data (content) for the region), in many cases such a loss of accuracy is acceptable within the context of a neural network. In particular, neural networks are typically expected to be able to operate using lossy compression (and thus to accept (and operate effectively with) a certain degree of inaccuracy). The Applicants have accordingly recognised that errors or loss of accuracy caused by comparing signatures would be similarly acceptable within the context of neural networks, and that a neural network should still operate effectively even if a signature-based comparison is used.

For example, when using signature-based comparisons, there is a risk that blocks (regions) containing different data may still have the same or sufficiently similar signatures which could cause errors. However, this will likely impact only a small portion of the data array and therefore any error will likely be small. As neural networks are good at generalising and coping with noise, if such errors did occur then it is likely that they wouldn't have a significant impact on the neural network processing.

Hence, the Applicants have recognised that the signature comparisons disclosed herein are suitable for used with neural networks, and may be used advantageously to eliminate write transactions thus reducing bandwidth and power consumption when operating a neural network.

The Applicants have further recognised that a similar signature comparison can correspondingly be performed to avoid read transactions from main memory for certain regions (blocks) of data arrays stored in main memory that are required for use by a neural network. For instance, if data which is to be read from main memory is determined to be sufficiently similar to data that is already held in local (second) memory, then the data processing system may not need to read that data from main memory. For example, it may be the case that a region (block) that is to be read into local memory from main memory for use by a layer of the neural network may be similar to a region (block) which has previously been read into local memory (e.g. there may be similarities between different regions derived from the same image, or a region derived from a previous image).

Such elimination or omission of read transactions may again reduce power and bandwidth consumption which, as discussed above, is particularly useful for portable or lower power devices.

Hence, in an embodiment, the data processing system further comprises second memory for storing data to be used by the processor when executing the neural network, and the method further comprises:

when a block of data that had been written to the memory is required by the processor for executing the neural network, determining whether to read the block of data into the second memory for use by the processor by:
    comparing the signature that was generated for the block of data that had been written to the memory and that is required by the processor, to a signature representative of the content of a block of data that is already stored in the second memory; and
    determining whether to read the block of data from the memory into the second memory on the basis of the comparison.

Similarly, in an embodiment, the data processing system of the technology described herein further comprises:

second memory for storing data to be used by the processor when executing a neural network;
wherein a data array to be used by the processor when executing a neural network is first read from memory to the second memory by loading blocks of data representing particular regions of the data array into the second memory before the data array is used by the processor; and wherein the processor is operable to execute the neural network using data from blocks of data stored in the second memory;

the processor further comprising:
comparison circuitry operable to, when a block of data of a data array is required by the processor for executing a neural network, determine whether to read the block of data into the second memory for use by the processor by:
comparing a signature representative of the contents of the region of the data array that the block of data represents, to a signature representative of the content of a block of data that is already stored in the second memory; and
determining whether to read the block of data from the memory into the second memory on the basis of the signature comparison.

In these arrangements, the second memory is in an embodiment a local (e.g. on-chip) memory of the processor, whilst the other memory is in an embodiment a main memory of the data processing system.

The Applicants corresponding believe that elimination of read transactions based on signature comparisons when executing a neural network may be advantageous in its own right (independently of whether write transaction elimination occurs).

Hence, in another embodiment, the technology described herein comprises a method of operating a data processing system, the data processing system comprising a processor operable to execute a neural network, a first memory and a second memory for storing data relating to the neural network processing being performed by the processor, wherein the processor is operable to load data from the first memory into the second memory and to execute the neural network using data that is stored in the second memory, the method comprising:

when a block of data representing a region of a data array is required by the processor for executing the neural network, if the required block of data is stored in the first memory, determining whether to read the block of data into the second memory by:
comparing a signature representative of the content of the block of data stored in the first memory that is required by the neural network to a signature representative of the content of a block of data that is already stored in the second memory; and
determining whether to read the block of data from the first memory into second memory on the basis of the comparison.

In another embodiment, the technology described herein comprises a data processing system, comprising:
a processor operable to execute a neural network; and
a first memory and a second memory for storing data to be used by the processor when executing a neural network;
wherein the processor is operable to load blocks of data representing regions of a data array to be used when executing a neural network from the first memory into the second memory, and to execute the neural network using blocks of data that are stored in the second memory;
the data processing system further comprising:
comparison circuitry operable to, when a block of data representing a region of a data array required by the processor for executing a neural network is stored in the first memory, determine whether to read the block of data into the second memory by:
comparing a signature representative of the block of data stored in the first memory that is required by the neural network to a signature representative of a region of a data array that is already stored in the second memory; and
determining whether to read the block of data from the first memory into second memory on the basis of the comparison.

The data processing system of the technology described herein may be any suitable data processing system that can execute a neural network and may comprise any suitable and desired components and elements that a data processing system can comprise, such as one or more or all of: a display processing unit, a central processing unit (CPU), a graphics processing unit (GPU) (graphics processor), a video processor, a signal processor, a display and a memory.

Correspondingly, the processor that executes the neural network may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor.

The data processing system is in an embodiment implemented on (as part of) an electronic device. Thus the technology described herein also extends to an electronic device that includes the data processing system of the technology described herein (and on which the data processing system operates in the manner of the technology described herein). The electronic device is in an embodiment a portable and/or lower powered device, such as a mobile phone or tablet.

The memory in which the data arrays are stored may comprise any suitable memory of the data processing system, such as a main memory of the data processing system.

As discussed above, in an embodiment, the data processing system also includes further storage (memory) that is "local" to the processor, in which data can be stored for use by the processor when executing a neural network, rather than having to access data from the (main) memory. Hence, the data processing system may comprise both local (e.g. on-chip) and main (e.g. external) memory.

In this case, the processor in an embodiment executes the neural network using the local memory, such that if a block of data that is required by the processor is currently held in main memory, the block of data is loaded into local memory before being accessed by the processor for executing the neural network.

The technology described herein may be used in conjunction with any suitable and desired neural network. In embodiments, the neural network is a convolutional neural network.

The technology described herein can correspondingly be used for any form of neural network processing such as when the neural network is being used to generate a (useful) output as may be output during inferencing by the neural network, but also as may be output during training of the neural network, or any other operation of the neural network that operates on or generates a data array.

In an embodiment, the neural network processing is used to process an input data array. Thus in an embodiment, the data processing system is processing an input data array using a neural network and the processor is processing an input data array using a neural network (and the processor is operable to execute a neural network to process an input data array).

The input data array which is processed by the neural network may comprise any suitable input data array which can be processed by a neural network to produce a useful output. For instance the input data array may comprise, an image, an image from an Image Signal Processor (ISP), an image frame from video data, sound data or voice data, or other input data. Correspondingly the neural network may be operable to identify or classify features present within the input data array, e.g. such as objects in an input image, or sound features in input sound data.

The data array for which signatures may be generated and compared when writing blocks of a data array to memory may be any suitable data array that is generated during the neural network processing. In an embodiment, the data array for which signatures are generated and compared comprises a data array that is output by a layer of the neural network, such as by a convolutional layer, a pooling layer or a fully connected layer of the neural network. In an embodiment, the data array for which signatures are generated and compared comprises a feature map (which is in an embodiment output by a convolutional layer or a pooling layer). In an embodiment the data array is derived from an input data array, for instance being derived from sound data or in an embodiment image data. Alternatively, the data array may comprise a data array that sets parameters for neural network processing (e.g. an array of weights or other layer data, which may be generated, e.g., during neural network training).

When reading a data array from memory based on a signature comparison, that data array may comprise any suitable data array that may be required by the neural network, and in an embodiment comprises a data array that is to be used by a convolutional layer, a pooling layer, or a fully connected layer of the neural network, such as, and in an embodiment, a feature map. This data array (for which the signature-based read transaction elimination is performed) may correspond to an input data array comprising, e.g., image or sound data. Alternatively, the data array may be a data array (e.g. a feature map) that was previously output by a layer of the neural network (e.g. by a convolutional layer or pooling layer). Hence the data array may have been derived from in an input data array, for instance being derived from sound data or, in an embodiment, image data.

The data array that is subjected to the write and/or read transaction elimination can in an embodiment also or instead (and in an embodiment also) comprise a (and any) data array that is used by the neural network when processing input data. For instance, the data array may comprise a data array that is used to set the parameters for the neural network processing, e.g. an array of weights or a weight map (which is to be used when processing e.g. a convolutional layer or a pooling layer of the neural network).

For example, when it is desired to perform inferencing using the neural network, such a data array (e.g. weight map) may be stored in main memory and may need to be read into local memory for use by the relevant layer of the neural network, e.g. when that layer of the neural network is operating. The data array (weight map) can be read into local memory on a block-by-block basis in the manner of the technology described herein, and based on a signature comparison performed based on blocks representing regions of the data array (weight map) which are to be read into local memory.

As another example, during training of the neural network, such data arrays (e.g. weight maps) are generally adjusted or optimised based on training input data arrays, to ensure that the neural network will produce the desired output. Therefore, during training, such data arrays (weight maps) may be read from memory, and a modified version of the weight may be written to memory. This reading and writing may be performed on a block-by-block basis, and so the read and/or write transaction elimination of the technology described herein may, in an embodiment, apply to these situations.

In an embodiment, the neural network comprises one or more, and in an embodiment a plurality of layers, which operate in turn e.g. such that the output data from one layer becomes the input data for a next layer. In an embodiment, the read and/or write transaction elimination is performed for one or more, and in an embodiment plural layers of the neural network, and in an embodiment, each layer of the neural network.

In the write transaction elimination process of the technology described herein, a block of data is compared against another block of data already present in the main memory to determine whether to write that block of data to the main memory. The block of data already stored in the main memory may comprise any suitable block of data, for example, a different block of data from the same data array or a block of data from a different data array (e.g. that was previously written into main memory, or still resides in main memory).

For instance, the block of data already present in the main memory may comprise a block of data derived from the same input data array (e.g. image) as the block which is to be written out to memory, and which may have been generated by the same layer of the neural network (or a different layer of the neural network).

The block of data already present in the main memory may correspond to or be derived from a different region of the input data array (e.g. may correspond to a different region of the same data array that is currently being generated by the layer of the neural network).

In this regard, the Applicants have recognised that, if an input data array (e.g. image) has different regions that contain similar features, then the corresponding data array generated by a layer of the neural network may also contain regions having similar features, and so it may be possible to omit data write transactions for blocks representing those similar regions.

Alternatively, and in an embodiment, the block that is already present in memory (against which the newly generated block is compared) may correspond to a region of a different data array (e.g. which was derived from a different input data array (e.g. a different image, or a preceding image in a video, or previous sound data)). This different data array may have been generated by a same layer (or a different layer) of the neural network. In this regard, the Applicants have recognised that if successive input data arrays (e.g. successive images) processed by the neural network contain similar features, then the (successive) data arrays that are generated by a layer of the neural network may also contain similar features, such that it may be possible to omit writing a block of data representing a region of a data array, if a block of data for a region of another, e.g. previous, data array is sufficiently similar.

With regards to the read transaction elimination, the block of data which is already stored in (local) memory may comprise any suitable block of data, for example, a different block of data from the same data array (that is currently being read from memory for processing by the neural network), or a block of data from a different data array (e.g. that was previously read into local memory, or still resides in local memory, for example, a block of data that was used or generated during previous neural network processing by a same layer of the neural network).

In the case that blocks for other data arrays (e.g. weight maps) are being compared using the signatures in accordance with the technology described herein, the blocks that are compared may represent different regions of a same weight map, or regions of different weight maps (e.g. comparing a block of a weight map for processing a currently executing layer with a block of a weight map that had been written to or read from memory when executing a different (previous) layer of the neural network, or comparing a block of a weight map for processing a current input data with a weight map that was used (e.g. earlier in training) with a previous input data array).

The blocks of data representing regions of the data array, for which a signature may be calculated, may correspond to any suitable shape and size of region.

In one embodiment, each block of data represents a region corresponding to an entire data array (corresponding to, e.g. an entire image).

In an embodiment, a data array is divided into plural smaller regions for the purpose of the technology described herein. Hence, each block of data in an embodiment represents a region of the relevant data array which is smaller than the size of the data array. In this case, a data array could be divided into any suitable number of regions. Each of the regions is in an embodiment the same size (i.e. contains the same number of data points of the data array) and the same shape (configuration). The regions are in an embodiment rectangular, and in an embodiment square.

The processor may perform processing on regions (blocks of data) in turn, thereby operating a tile-based processing scheme (in which each tile corresponds to a block of the data array). In this case, the signatures may be, and are in an embodiment, generated for each tile (block) that is processed.

The signature for a block of data that is to be written to (or read from) memory is compared against a signature for a block of data that is already present in memory. The processor then determines whether or not to write (or read) the block of data to (or from) the memory on the basis of the signature comparison.

Determining whether or not to write (or read) the block of data to (or from) memory may comprise determining whether the block of data is the same as (or at least sufficiently similar to) the block of data already in memory. In an embodiment, the block of data is not written to (or read from) memory if it is determined that the block of data is the same as (or at least sufficiently similar to) a block of data already in memory.

Hence, in an embodiment, the technology described herein comprises comparing the signature for a block of data that is to be written to (or read from) memory with a signature for a block of data that is already present in memory, and determining whether the signatures are the same or sufficiently similar. In an embodiment, if the signature for the block of data that is to be written to (or read from) memory is the same as or sufficiently similar to the signature for the block of data that is already in memory, then it is determined that the block of data should not be written to (or read from) memory. In an embodiment, if the signature for the block of data that is to be written to (or ready from) memory is not the same as or is not sufficiently similar to the signature for the block of data that is already in memory, then it is determined that the block of data should be written to (or read from) memory.

Hence, the block of data is written to (or read from) memory if the signatures are the same or sufficiently similar. Whereas, the block of data is written to (or read from) memory if the signatures differ (e.g. if the signatures differ at all, or if the signatures differ by at least a threshold amount).

The technology described herein may require an exact signature match in order to eliminate (omit) a write (or read) transaction for a block of data.

Alternatively (and in an embodiment), an exact match is not required, such that the write (or read) transaction can be eliminated (omitted) provided the compared signatures are sufficiently similar. This is lossy and less precise than requiring an exact match, e.g. since the block of data this is ultimately stored in memory may not be exactly the same as the block of data that was generated by the neural network processing and which was to be written memory. However, it is expected that such losses will be acceptable within the context of neural network processing since (as discussed above) neural networks are generally expected to be able to operate with a certain amount of losses and inaccuracy.

In an embodiment, the signature for the data block which is to be written to (or read from) memory is compared against a signature for a single data block already present in memory. In another embodiment, the signature for the data block which is to be written to (or read from) memory is compared against plural signatures for respective plural data blocks that are already present in memory.

The signatures that are compared are each representative of the content of the block of data array (region). The signature may comprise any suitable information (e.g. derived from the content of the region/block of data) that can be considered to be representative of the content of the region/block of data, such as a checksum, a CRC, or a hash value, etc. For example, suitable signatures could include standard CRCs, such as CRC32, or other forms of signature such as MD5, SHA-1, etc.

Although the generation of a signature for regions will require some processing and memory resource, the Applicants believe that this will be outweighed by the potential savings in terms of power consumption and memory bandwidth that can be provided by the technology described herein, particularly when used to eliminate write and/or read transactions in the manner of the technology described herein.

The signatures can be generated at any suitable and desired stage before a data block is written to the memory. When a data block is written to the memory, its associated signature is in an embodiment also written to the memory in association with the data block.

The signatures which are generated can be stored in any suitable manner. In an embodiment, the signatures are stored in main (external, off-chip) memory, in an embodiment in association with the block of data that the signature represents. Alternatively, the signatures could be stored (cached) in local (on-chip) memory so that the signature does not need to be fetched from external memory each time a comparison is to be performed.

In an embodiment, the processor compresses the data array (e.g. feature map or weight map) prior to writing the data array to memory. The compression is in an embodiment performed on a block-by block basis. The processor may compress the (or each) block of data prior to writing the (or each) compressed block of data to memory. The compression scheme may comprise any suitable compression scheme, such as a lossy compression scheme.

In such an arrangement, the signature for a block is in an embodiment generated before the block of data is compressed. In this case, the signatures to be compared may represent the content of uncompressed regions of the respective data arrays.

The Applicants have recognised that the signature comparison of the technology described herein may also be used to avoid having to perform compression on certain blocks of data generated by the neural network. Hence, with regards to the write-transaction elimination, when a block of data is to be written to memory, if on the basis of the signature comparison it is determined that the block should not be written to memory, in an embodiment the compression of the block of data is not performed. Hence, in the technology described herein, the compression of the block of data may be omitted or avoided (in addition to omitting or avoiding writing the block of data to memory) when another block of data having similar content is already present in the memory.

The signature comparison of the technology described herein can also be used to avoid or omit decompression of data when reading blocks of data from main (first) memory into local (second) memory when performing neural network processing. For instance, data may be stored in a compressed form in main memory, but in a decompressed form in local memory, such that data needs to be decompressed when it is read from main (first) memory into local (second) memory. In this case, the signature comparison and determination may be performed prior to decompressing a block of data that is stored in main memory. Decompression may be performed when it is determined (on the basis of the signature comparison) that a block of data should be read from first memory into second memory. If it is determined (on the basis of the signature comparison) that the block of data should not be read from first memory into second memory, then the decompression can be omitted.

Alternatively, however, the data may be stored in a compressed format in both the main (first) memory and the local (second) memory. In this case, no decompression is needed when reading data from the main (first) memory into the local (second) memory.

With regards to the signatures, as will be appreciated by those skilled in the art, the longer the signature that is generated for a data block is (the more accurately the signature represents the data block), the less likely there will be a false "match" between signatures (and thus, e.g., the erroneous non-writing of a new data block to the main memory). Thus, in general, a longer or shorter signature (e.g. CRC) could be used, depending on the accuracy desired (and as a trade-off relative to the memory and processing resources required for the signature generation and processing, for example).

In embodiments, the signature generation process is varied across the area of the data array so as to, for example, and in an embodiment, generate a simpler (e.g. shorter) signature for data array regions of lesser interest, and a more complex (e.g. longer) signature for regions of greater interest. Thus in an embodiment a different signature generation process can be, and is in an embodiment, used for different regions (data blocks) of a data array, e.g., and in an embodiment, in dependence on the content of the regions (blocks).

The regions (blocks) of greater interest may correspond to regions which are known (or predicted) to contain data relating to features of interest (e.g. corresponding to objects of interest in the input image). The regions (blocks) of lesser interest may correspond to regions which are known (or predicted) not to contain data relating to features of interest.

Whether or not a region is likely to contain features of interest may be determined prior to processing the input data array (input image) by the neural network (e.g. based on regions of interest that were identified for a previous input data array, or based on expected output from a processing system (e.g. graphics processor) that produced the input data array, or based on other processing or feature identification performed on the input data array). The regions (blocks) of greater or lesser interest may also (or instead) be defined based on an expected output from the layer that will produce the data array.

Regions of greater interest of the data array may contain data values that correspond to certain values, e.g. non-zero values or values that are greater than a threshold value, which may indicate the presence of features of interest. Similarly, regions of lesser interest of the data array may contain data values that correspond to certain values, e.g. zero values or values that are less than a threshold value, which may indicate the absence of features of interest.

Hence, in embodiments, the signature generation process is varied between different regions (blocks) such that the type or complexity of the signature generation is different for different regions (blocks) of the data array. For instance, a signature type or complexity may be selected based on the known (or predicted) presence of particular values within the region (block) of the data array.

The presence of particular values (and/or the region "classification") may be identified and performed by the processor as the data array is being generated (i.e. "on-the-fly"). Alternatively, the, e.g., host processor that is requesting the neural network processing could determine (predict) those regions that are likely to be of greater or lesser interest, and indicate this to the processor, e.g. as state information or metadata, with the processor then selecting the signature type to use for a region based on that "signature indication data" which is provided to the processor. The, e.g., host may determine the regions of interest, e.g. from the input data array, or from a previous data array that was generated by the neural network.

Alternatively, detection circuitry may detect regions of greater interest within a data array (e.g. detecting objects in an image) prior to neural network processing. In another alternative, the regions of interest may be determined based on a user input, or data relating to a user's interaction with the data array prior to neural network processing, for example as a result of eye or head tracking information (in which case, regions of greater interest may be identified as, e.g., regions on which the user's attention is focussed for a threshold amount of time).

In an embodiment, at least two signatures are generated for a data block. The signatures comprise a first (upper) signature and a second (lower) signature. The first signature is representative of one or more of, and in an embodiment a set of, the MSBs (most significant bits) of the block of data, for example being calculated based on first n MSBs of each data point in the data array that is represented by the block. The second signature is representative of one or more of, and in an embodiment a set of the LSBs (least significant bits) of the block of data, for example, being calculated based on the remaining LSBs of each data point in the data array that is represented by the block (that are not included in the "MSB" signature). Although the foregoing will be described with reference to two signatures (the MSB signature and the LSB signature) for a block of data, a higher granularity could be used such that more than two signatures are generated for a block of data. For instance, the signatures may comprise a first (upper) signature, a second (lower) signature, and one or more other (intermediate) signatures. The upper signature may be representative of the first n MSBs of each data point in the block of data, and the lower signature may be representative of the first m LSBs of each data point in the block of data (where n and m are both integers). The other (intermediate) signatures may be representative of the remaining bits of the block of data which are not used for the first (MSB) or second (LSB) signatures.

The signature comparison (for read or write transaction elimination) may comprise comparing at least one of the respective MSB, LSB and intermediate signatures for the data blocks that are being compared.

The processor is in an embodiment operable to write (or read) to (or from) memory the MSB data for a data block (region) separately from the LSB data for a data block (region). Hence, when writing (or reading) a data block to (or from) memory, the data processor may be configured to write (or read) the block as an MSB part and an LSB part. The MSB part may comprise one or more of, and in an embodiment a set of the MSBs of the block of data. The LSB part may comprise the remaining LSBs of the block of data that are not included in the MSB part. In an embodiment, the MSB and LSB parts match the MSB and LSB signatures (where used). Where one or more intermediate signatures are used, these signatures may also be written to or read from memory separately from the MSB and LSB signatures, and matching intermediate parts of the data block may be written to or read from memory separately from the MSB and LSB parts.

The MSB part and the LSB part (and other intermediate parts) of the block of data may be stored in separate regions of (main) memory. The MSB part and the LSB part (and any intermediate parts) may be compressed with a lossless or a lossy compression scheme prior to writing to (main) memory.

The MSB and LSB (and other intermediate) signatures may be written to main memory in correspondence with writing the MSB and LSB (and other intermediate) parts to main memory.

Where plural signatures are generated for a block of data, different signature generation processes may be used for generating plural (or each) of the signatures for a data block. For instance, it may be the case that differences between the MSBs of data blocks that are being compared may be of more interest (or more critical) than differences between the LSBs. Hence, the signature generation process may be varied such that the upper (MSB) signature is longer and more complex than the lower (LSB) signature. In this manner, the MSB signature can retain more detail (or accuracy) about the underlying data than the LSB signature.

Furthermore, the Applicants have recognised that the MSBs of the data array (e.g. feature maps) are likely to be similar (e.g. between successive images, or for different regions of the same region) whilst the LSBs may change.

Hence, in an embodiment, the signature comparison comprises comparing a first signature of the blocks (representative of the MSBs of the blocks), and also comparing a second signature of the blocks (representative of the LSBs of the blocks). The comparison may also comprise comparing one or more other (intermediate) signatures of the blocks. The determination of whether or not to write a block of data to memory can thus be made on the basis of the comparison of at least one of the first (MSB), second (LSB) and one or more other (intermediate) signatures. For example, when the first (MSB) and second (LSB) (and other intermediate) signatures are sufficiently similar, then writing (or reading) of both of the MSB and LSB (and other intermediate) parts of the block of data can be omitted, since a similar data block already exists in memory. On the other hand, when the first (MSB) signatures differ (e.g. by more than a threshold amount), then the writing (or reading) of the MSB and LSB (and other intermediate) parts of the block of data should still be (and in an embodiment is) performed (i.e. omission is not recommended) since the data block that already exists in memory is different.

However, in an embodiment, if the first (MSB) signatures are similar, but the second (LSB) signatures differ, then only the data that was used to generate the second (LSB) signature is written to (or read from) memory (and the writing/reading can be omitted for the data used to generate the first (MSB) signature). In other words, if only the data corresponding to the LSBs of a data block changes, then only this portion need to be written to (or read from) memory. Similarly, if it is determined from the signature comparison that only an intermediate part of the data block changes, then only that intermediate part needs to be written to (or read from) memory. This may reduce the amount of read/write traffic, and reduce power and bandwidth consumption in the data processing system.

Alternatively, since a neural network may use a lossy compression scheme (and is therefore capable of operating even if some inaccuracies are present), then any changes to the LSB (and intermediate) parts of the data block could be ignored. In this case only the first (MSB) signatures may be compared, and the determination as to whether or not to write out the MSB and LSB (and intermediate) parts of the data block to memory may be based on the comparison of the first (MSB) signatures (only).

In the technology described herein, the signature comparison is performed when a data array generated by (or required for) the neural network is to be written out to (or read from) memory.

As discussed previously the data processing system may comprise local (second) memory in addition to main (first) memory. In such arrangements, the data processing system may preferentially operate to store data arrays in the local memory if there is enough space in the local memory. The data processing system may only write to main memory if there is not enough space in the local memory. Hence, the data processing system may only perform the signature generation, signature fetch and signature comparison in the case that data needs to be written to main memory.

Hence, in an embodiment, when a data array is to be written to memory it is (first) determined whether where is sufficient space in the local (second) memory to store the data array. If it is determined that there is sufficient space (e.g. if it is determined that the size of the data array is smaller than the size of the second memory), then blocks of data corresponding to regions of the data array will be written to the local (second) memory. If it is determined that there is insufficient space (e.g. if it is determined that the size of the data array is larger than the size of the second memory), then blocks of data corresponding to regions of the data array will be written to the main (first) memory (subject to the signature comparison of the technology described herein).

Correspondingly, when reading data from memory, the data processing system in an embodiment first determines whether the required data is present in the local (second) memory, in which case the data processing system can directly read the data from the local (second) memory when performing neural network processing. However, if the required data is not available in local (second) memory, then the data processing system will identify the required data in the main (first) memory, and, subject to the signature comparison of the technology described herein, read blocks of data corresponding to regions of the required data array from the main (first) memory into the local (second memory) for use when performing the neural network processing.

In the case that the data processing system is processing successive input data arrays (e.g. successive image frames from video data), it may be desirable to output a data array generated by neural network processing of a particular input data array to main (first) memory even if it would be small enough to store in second (local) memory. For instance, if may be useful to write the data array to main (first) memory if it is likely that the data array will be used again (e.g. for processing a subsequent input data array), and/or if the data array that is generated is unlikely to change between successive input data arrays. Hence, in an embodiment the data processing system may be operable to determine whether a data array is likely to be similar to a data array generated using a next input data array. The data processing system may be operable to, if it is determined that a data array is likely to be similar to a data array generated using a next input data array, write that data array to main (first) memory, even when it could be stored in the local memory. The writing of the data array to main memory may be subject to the signature comparisons of the technology described herein.

Due to the possibility of the use of signatures causing a loss of accuracy or introducing errors, in an embodiment it is possible to selectively disable the signature generation and comparison of the technology described herein (e.g. in cases where the data processing must be correct, and must use data accurately). For instance, the signature generation and/or comparison may be omitted in response to an indication that the signature generation and/or comparison should not be used.

The data processing system may comprise and/or be in communication with one or more memories (such as the memories described above) that store the data described herein, and/or store software for performing the processes described herein. The data processing system may be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuitries may share processing circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows schematically a data processing system 100 which may be used in conjunction with the technology described herein. The system 100 comprises a System on Chip (SoC) system 110. Part of the data processing system which may be on chip comprise an image signal processor (ISP) 102, a video decoder 103, an audio codec 104, a CPU 105 and a convolutional neural network engine accelerator (CNNA) 106, which may be operably connected to a memory controller 108 by means of a suitable interconnect 107. The memory controller 108 may have access to external, off-chip memory 109. A sensor 101 may provide input data for the system 100 (e.g. video data and/or sound data from a suitable camera or microphone or other sensor device). Although the CPU and CNNA are shown separately in FIG. 1, the CNNA could be incorporated into the CPU or GPU.

Figure 2:
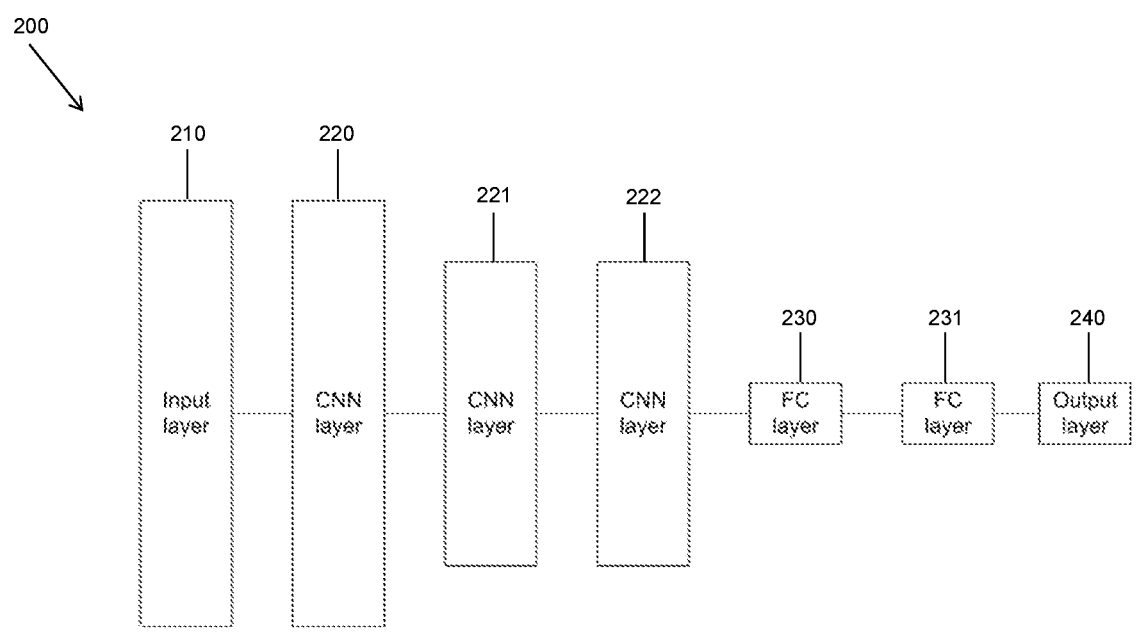

FIG. 2 shows schematically a neural network 200 that the technology described herein may be used for. The neural network may be any suitable type of neural network. In the present embodiments, the neural network is a convolutional neural network (CNN), which is the type of neural network shown in FIG. 2. The CNN comprises a number of layers which operate one after the other, such that the output from one layer is used as the input for a next layer.

The CNN shown in FIG. 2 comprises an input layer 210. The input layer may be adapted to receive an input data array (e.g. comprising data corresponding to image or sound data). The input layer may comprise a number of processing nodes (or "kernels") which receive an input data array and pass that data array on to the next layer of the neural network.

The next layer shown in FIG. 2 is a convolutional neural network (CNN) layer 220, which comprises a convolutional layer. The convolutional layer may generate a feature map which comprises a representation of features that were present in the data array that was provided to the convolutional layer.

A pooling layer may also be provided after the convolutional layer (in FIG. 2 these are both incorporated into the CNN layer, although it is to be understood that they can comprise separate layers). The pooling (or "downsampling") layer may operate to reduce the size of a data array (e.g. feature map) that is input into the pooling layer. Hence, as shown in FIG. 2, successive CNN layers may be smaller since they are processing smaller data arrays. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer).

After one or more CNN layers 220, 221, 222 the neural network may comprise one or more fully connected (FC) layers 230, 231. The fully connected layers may operate on a data array (e.g. feature map) generated by the convolutional and/or pooling layers. The one or more fully connected layers may operate one after the other such that the data that is output from one fully connected layer is used as the input data for a next fully connected layer. The final fully connected layer may produce a final output data array or output data set which may comprise a useful output (e.g. an identification or classification of an object in the image data that was originally received by the input layer of the CNN).

The final fully connected layer 231 passes the useful output to the output layer 240 of the neural network. The output layer 240 comprises a number of processing nodes which receive the useful output data and pass the useful output data on towards other components of the data processing system which are outside of the neural network (e.g. such as further processing and display components which can display the output data, for example).

Although FIG. 2 shows a certain number of CNN and FC layers, the neural network may comprise fewer or more such layers if desired (and may also or instead comprise other layers which operate in a different manner to the CNN and FC layers).

Figure 3:
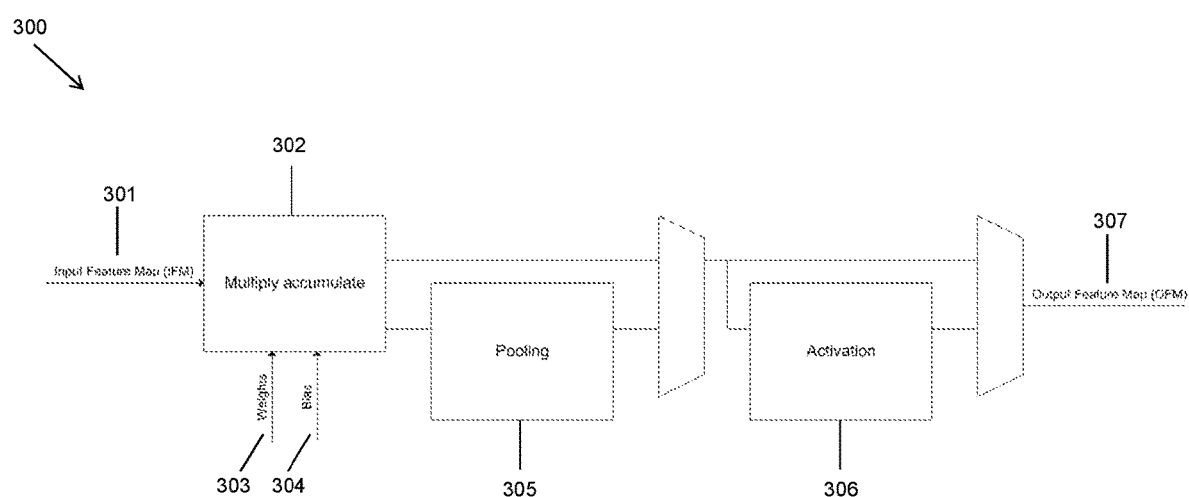
FIG. 3 shows schematically the operation of a convolutional neural network (CNN) layer which may perform pooling.

FIG. 3 shows schematically the operation of a convolutional neural network (CNN) layer 300 which may perform pooling. The CNN layer operates on a data array 301 which is shown to be an input feature map (IFM), (which may have been received from a previous CNN layer as discussed above).

The CNN layer performs an operation to modify the data array in order to produce (output) a modified data array (e.g. feature map). The operation may require parameter information to be read from memory.

In the case shown in FIG. 3, the CNN layer performs a multiply accumulate operation 302. The multiply accumulate operation 302 may use parameter information may comprises weights 303 (e.g. a weight array) and a bias 304, which may be read from local or main memory. Generally speaking, the weights will have been selected to extract or identify certain features within the input data set, such as e.g. edges.

Generally, a multiply accumulate operation may comprise performing a weighted sum of a selection of points from the data array (e.g. feature map). The selected points may be referred to as a "receptive field" or a "window". The weights for the weighted sum may also be referred to as a "filter" or "kernel". Each data point of the output feature map may be generated using a multiply accumulate operation as follows:

$$Y = w1 \cdot X1 + w2 \cdot X2 \ldots + w1 \cdot Xn + b$$

wherein Y is an output data point, where X1 to Xn are input data from input data points, where w1 to wn are associated weights, and where b is a bias that is added.

When the CNN layer is executing, the array of weights may be "slid" (or "convolved") over the input data array (e.g. image or input feature map) one data point at a time, so as to build up an array of data points for the output feature map.

A CNN layer may perform plural multiply accumulate operations, each using a different set of weights, to generate plural output feature maps which extract or identify different features. If a CNN layer receives plural input feature maps, each multiply accumulate operation may act (perform a weighed sum) across all of the input feature maps.

A pooling operation 305 may or may not also be applied. The pooling operation may produce a smaller, equivarient representation of the data array that was generated by the multiply accumulate operation 302. The pooling operation may comprise maxpooling, average pooling, or L2-norm pooling, or any other suitable pooling.

An activation operation 306 may or may not also be applied. The activation operation 306 may comprise applying a non-linear function (referred to as an "activation function") to the data points of the data array that is generated by the multiply accumulate 302 (and pooling 305) operations. The activation function may comprise a ReLU, sigmoid or tanh(x) function, or any other suitable function.

Figure 4:
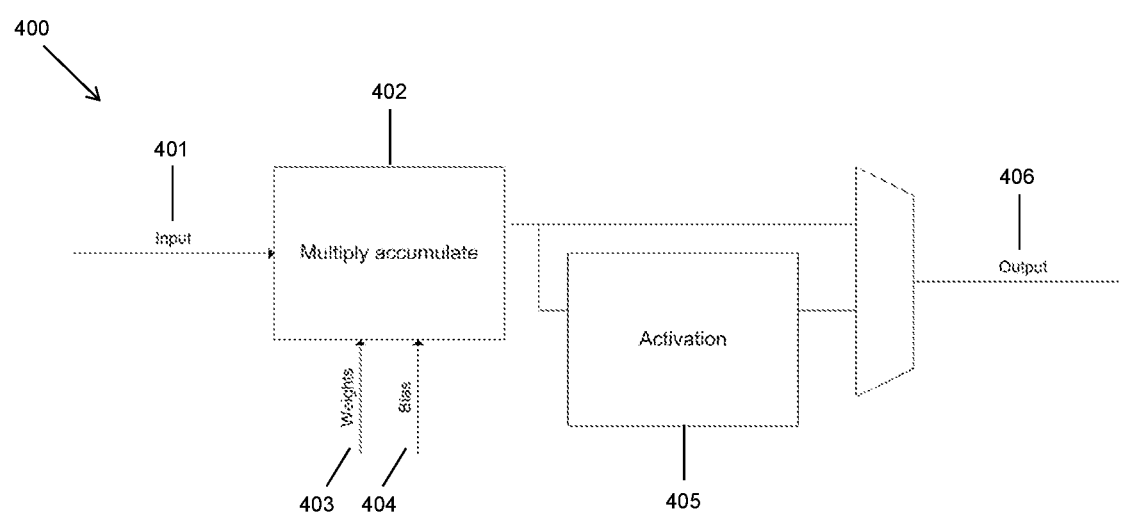
FIG. 4 shows schematically the operation of a fully connected layer of a neural network.

FIG. 4 schematically shows the operation of a fully connected (FC) layer 400 of a neural network, in an embodiment. The FC layer 400 may take as an input 401, a feature map that was generated by a previous CNN layer, or an input data array that was generated by a previous FC layer. The FC layer 400 may perform a multiply accumulate operation 402 (using weights 403 and bias 404 which may be read from local or main memory) on the data array that is input into the FC layer 400. The FC layer 400 may or may not also perform an activation operation 405 e.g. using a suitable non-linear activation function. The FC layer may produce an output 406 (e.g. a data array) which may be used by a next FC layer or an output layer, as discussed above.

Figure 5:
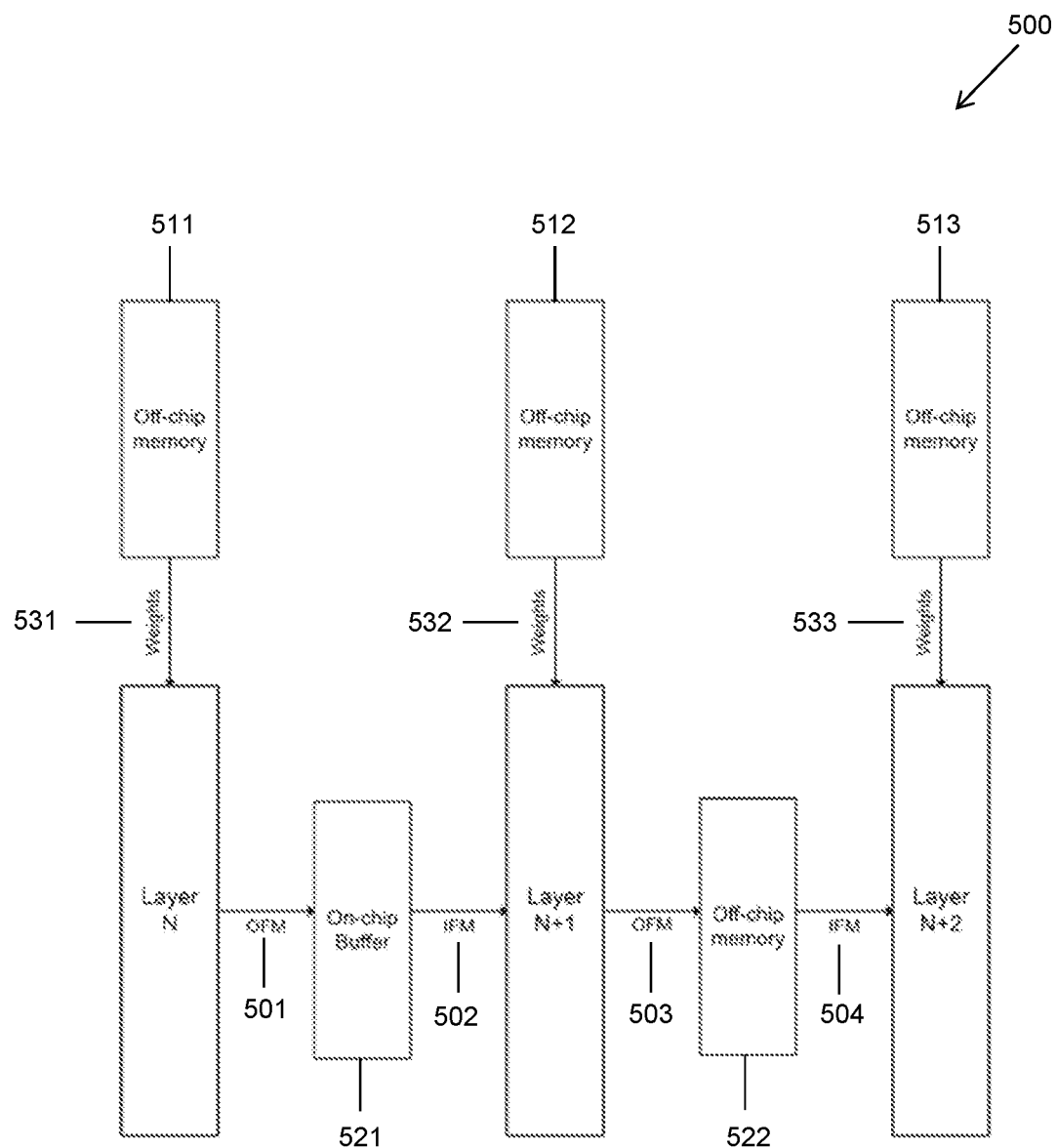
FIG. 5 shows schematically a data flow for the layers of a neural network.

FIG. 5 shows schematically a data flow for the layers of the neural network. The neural network comprises multiple layers N, N+1 and N+2. In the embodiment shown in FIG. 5, layer N generates a data array which comprises an output feature map (OFM) 501, which is small enough to be stored on local memory (on-chip buffer 521). Layer N+1 then reads the data array as an input feature map 502 from the on-chip buffer 521.

Layer N+1 generates another data array which comprises another output feature map (OFM) 503. However, in the case shown, OFM 503 is too large to be stored in local memory, so OFM is stored in main memory (off-chip memory 522). This is be done by storing blocks of data corresponding to regions of the OFM to the off-chip memory 522, subject to the signature comparison of the technology described herein.

When the next layer N+2 requires the data array from layer N+1 as an input feature map 504 for the neural network processing performed by layer N+2, then the data array must accordingly be read from off-chip memory. Layer N+2 could read the data array directly from off-chip memory 522 (as shown in FIG. 5). However, in an embodiment, blocks representing regions of the data array are first read into local (on-chip) memory, such that the layer N+2 uses those blocks stored in local memory when executing its neural network processing. The reading of blocks from the main (off-chip) memory into the local (on-chip) memory is subject to the signature comparison of the technology described herein.

As shown in FIG. 5, each of the layers N, N+1, N+2 may read processing parameters comprising weights 531-533 (or weight arrays) from main (off-chip) memory 511-513. Although FIG. 5 shows the weights being read directly from off-chip memory, in an embodiment, the weights are first read into local (on-chip) memory for use by the layers. For instance, blocks of data representing regions of weight arrays (or portions of the weight data) may be read into local memory, such reading being subject to the signature comparison of the technology described herein.

In an embodiment, the off-chip memories 511-513 and 522 are the same off-chip memory.

Figure 6:
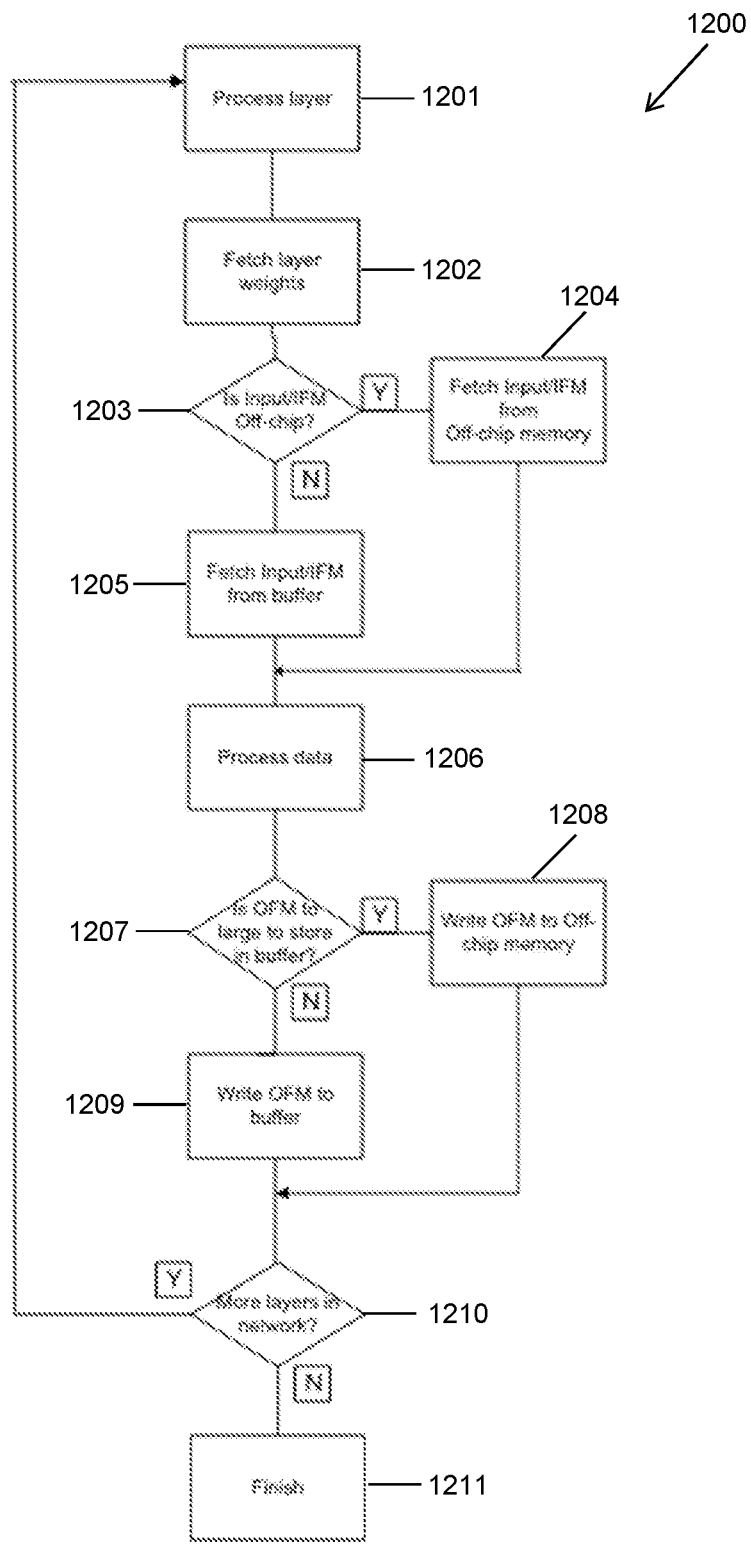
FIG. 6 is a flow chart for neural network processing without using transaction elimination.

FIG. 6 is a flow chart showing neural network processing without using the transaction elimination operation of the technology described herein. Each loop through the flowchart corresponds to the processing performed when executing a layer of the neural network.

At 1201 processing commences for the layer (which is, for example, CNN layer). At 1202, weights (e.g. a weight array) that are required for the neural network processing are fetched. An input data array or input feature map (IFM) also needs to be fetched for the neural network processing which is to be performed by the layer.

The data processing system performs processing using data arrays that are stored in local (on-chip) memory. If a required data array is not present in the local (on-chip) memory it may need to be read from main (off-chip) memory into local (on-chip) memory for use during neural network processing. Hence, at 1203, a determination is made as to whether or not the input data array or IFM is stored in main (off-chip) memory 1203. If the input data array or IFM is stored in off-chip memory, then the processing proceeds to fetch the input data array or IFM from off-chip memory 1204. If not, then the processing proceeds to fetch the input data array or IFM from the local (on-chip) buffer 1205.

At 1206 the input data array or IFM is then processed using the weight array that has been fetched. The processing generates a data array that corresponds to an output feature map (OFM).

As mentioned previously, the data processing system may preferentially store data in the local (on-chip) memory if there is sufficient space. Hence, at 1207 a determination is made as to whether the OFM is too large to store in the local (on-chip) buffer. If the OFM is too large to store in the local (on-chip) buffer, then the OFM is written to main (off-chip) memory 1208. If not, then the OFM is written to the local (on-chip) buffer 1209.

This completes the processing for that particular layer of the neural network.

It is then determined at 1210 whether there are more layers in the neural network for which neural network processing is to be performed. If there are more layers, then the processing proceeds to the next layer in the neural network, (i.e. the process returns to starting point 1201 and the processing outlined in the flow chart is repeated for the next layer of the neural network). If there are no more layers in the neural network for which the processing shown in the flowchart is applicable (e.g. if only an output layer of the neural network remains) then the process finishes.

As can be seen from FIG. 6 and the associated description, without the transaction elimination of the technology described herein, entire data arrays may need to be written out to or read from memory during neural network processing by a layer. As discussed previously, this can consume a large amount of processing power, bandwidth and memory.

Figure 7:
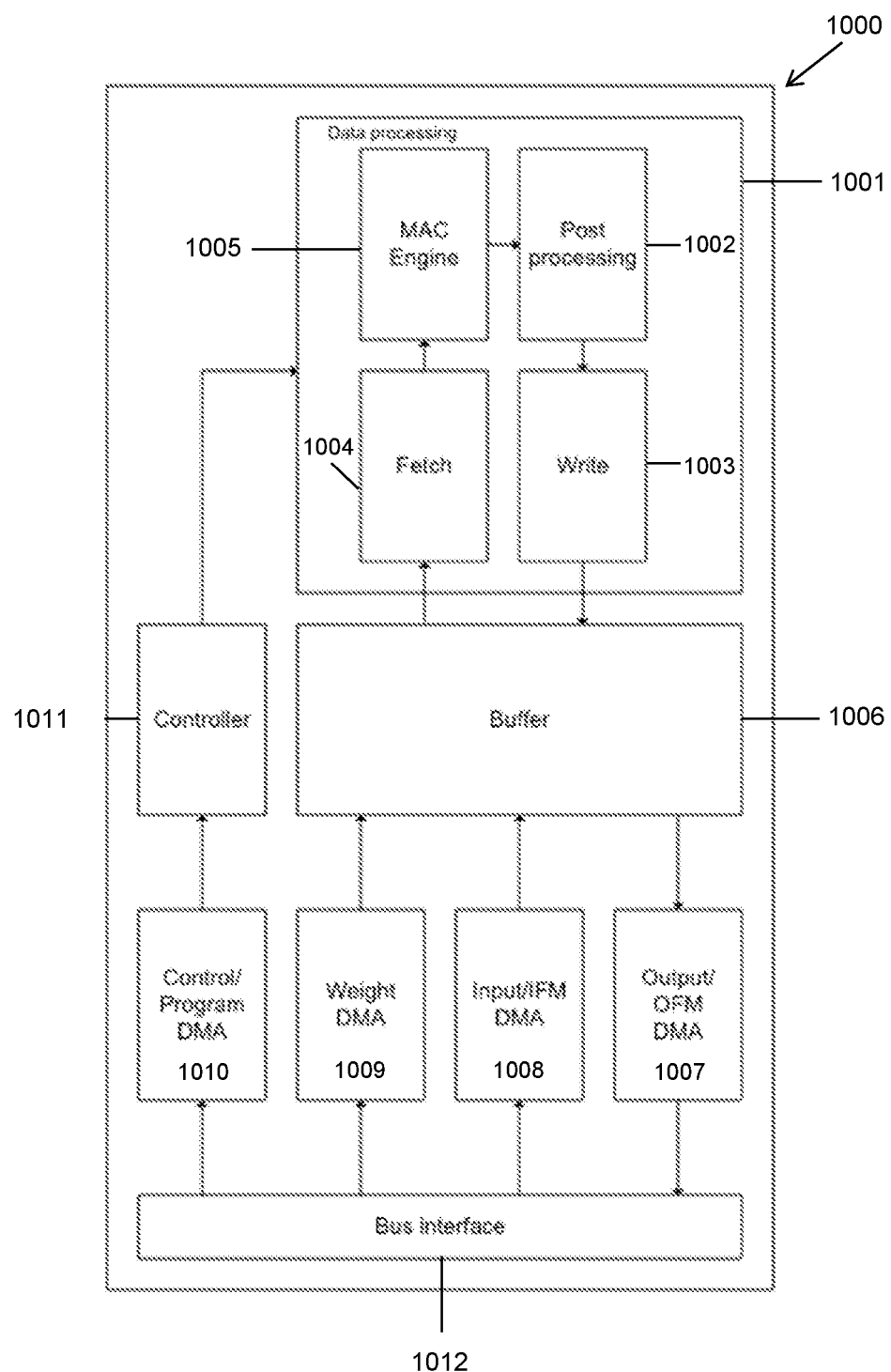
FIG. 7 is a schematic diagram of a data processing system operable to execute a neural network which operates without the transaction elimination of the technology described herein.

FIG. 7 is a schematic diagram of a data processing system 1000 operable to execute neural network processing without using transaction elimination (such as described with respect to FIG. 6).

The data processing system 1000 comprises a number of on chip components such as data processing circuitry 1001 which performs the neural network processing (e.g. using a post processing unit 1002). The data processing circuitry 1001 may comprise fetch circuitry 1004 for fetching data (e.g. corresponding an input data array or a feature map) from a buffer (local, on-chip memory) 1006. The data processing circuitry 1001 may comprise write circuitry 1003 for writing data (e.g. corresponding data arrays such as output feature maps) to the local memory (buffer 1006). The data processing circuitry 1001 may also comprise a MAC Engine.

As discussed above, the data that is required for (or generated by) the neural network processing (e.g. such as input feature maps, output feature maps, weights arrays, biases, and other program control data) may be stored in off-chip memory (not shown).

The data that is stored in the off-chip memory may need to be loaded into local (on-chip memory) 1006 before it can be used for neural network processing. The data processing system 1000 therefore comprises an output feature map (OFM) direct memory access (DMA) unit 1007, an input feature map (IFM) direct memory access (DMA) unit 1008, a weight array direct memory access (DMA) unit 1009 and a control/program direct memory access (DMA) unit 1010.

The DMA units 1007-1010 are operable connected to the on-chip memory (buffer 1006) and to main off-chip memory via a bus interface 1012.

A controller 1011 may also be provided for controlling the data processing circuitry 1001 for executing the neural network.

Figure 8:
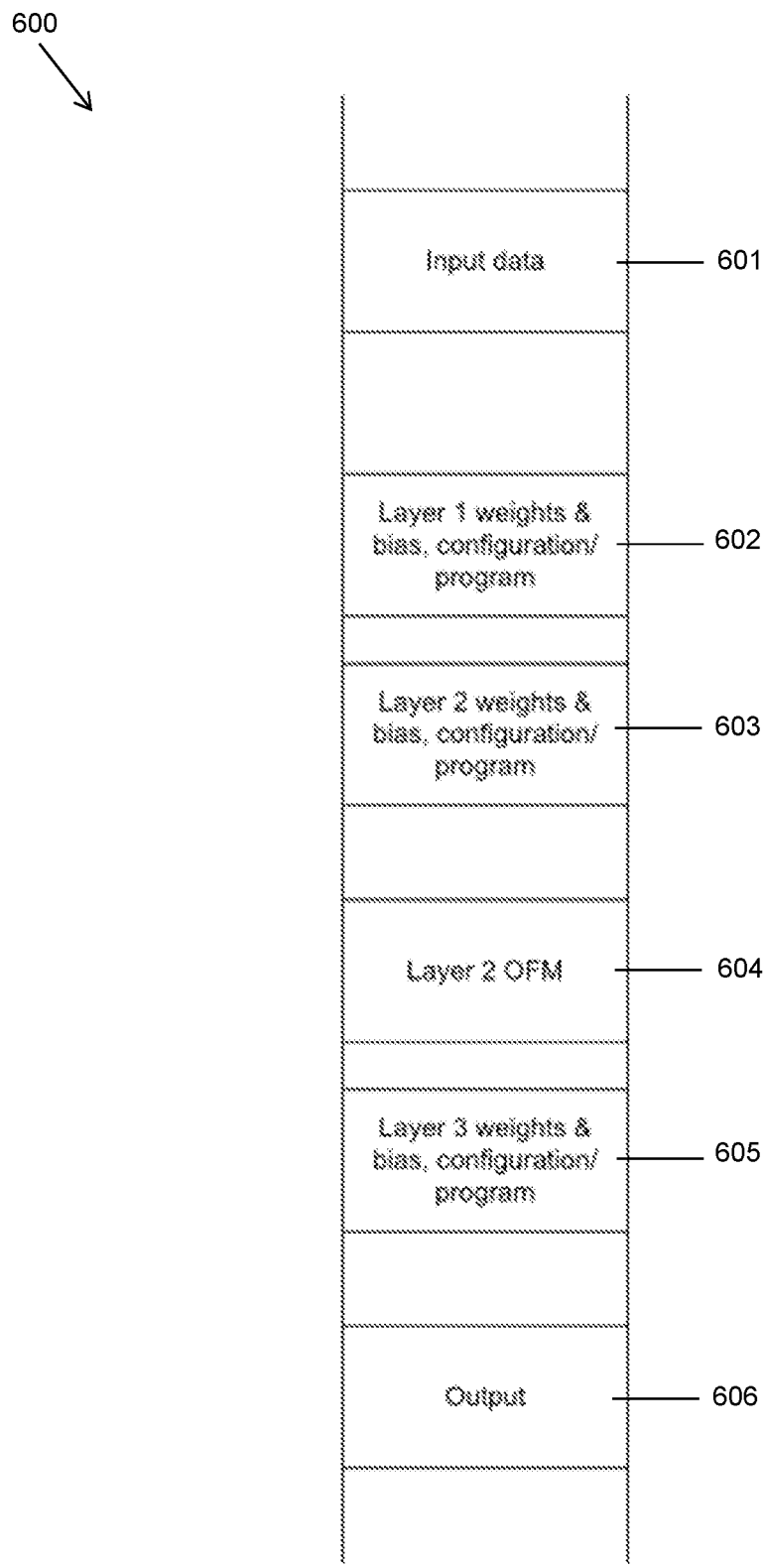
FIG. 8 shows the contents of main (off-chip) memory for data processing system executing a neural network without using transaction elimination.

FIG. 8 shows an example of the contents of main (off-chip) memory for a data processing system that is executing a neural network without transaction elimination. The contents of the off-chip memory comprise input data 601 which may be used an input data for a first layer (Layer 1) of the neural network. In the particular example shown, the weights (weight array), bias, and configuration/program information for the layers of the neural network (Layer 1, Layer 2 and Layer 3) are also held in the off-chip memory. It can be seen that no output feature map has been written to off-chip memory for Layer 1. This is because that output feature map was small enough to be stored locally instead (as discussed previously).

However, it can be seen that the output feature map 604 from Layer 2 (which is too large to be stored locally) is stored in the off-chip memory.

The off-chip memory also stores output data 606, which may comprise, for example the output feature map from Layer 3.

Figure 9:
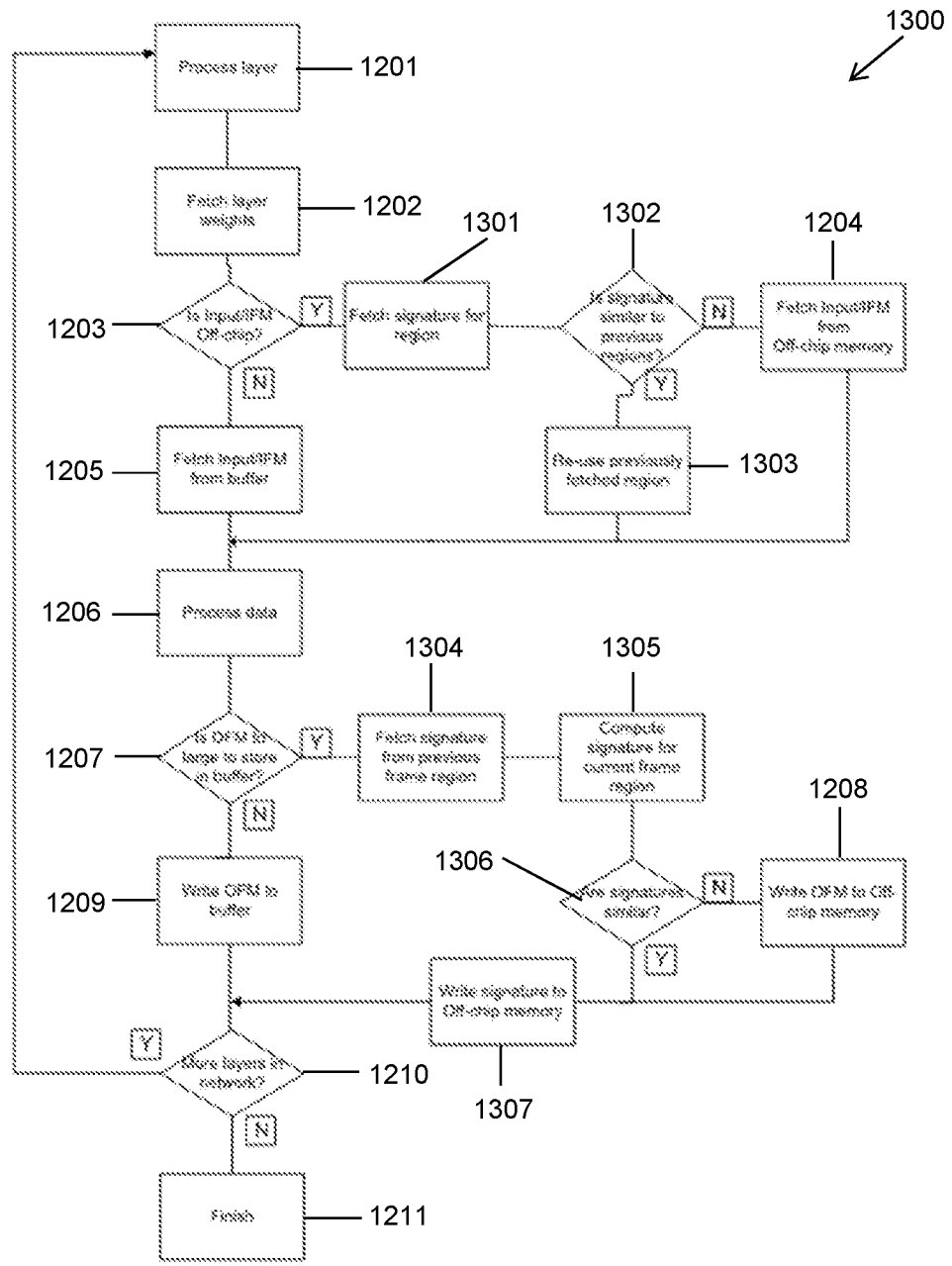
FIG. 9 is a flow chart showing neural network processing without using transaction elimination.

FIG. 9 is a flow chart showing neural network processing in an embodiment of the technology described herein (i.e. using the transaction elimination operation of the technology described herein). This can be contrasted with FIG. 6 (which does not use transaction elimination). Processing steps that are the same as those described FIG. 6 are shown with like numerals.

It can be seen that FIG. 9 comprises a number of additional processing steps relating to signature-based read-transaction eliminations. In particular, after determining that a required input data array or IFM from off-chip memory is in off-chip memory 1203, the processing proceeds to fetch a signature for a region of the input data array or IFM 1301. As discussed previously, the signature is representative of the content of a block of data representing a region of the data array. Hence, when using the transaction elimination, the data arrays may be read on a block-by-block basis.

The signature is then compared to a signature of a block of data (region) that had previously been fetched from main (off-chip) memory into local (on-chip) memory 1302. As discussed previously, the previously fetched region in an embodiment comprises a region derived from or used when processing a previous input data array. For example, the previously fetched region may comprise a region from a previous image or frame, a region of a previous feature map, a region of a previous weight array, or other data that was previously required by (or output from) a layer of the neural network. Alternatively, the previously fetched region may comprise another region derived from or used when processing the input data array that is currently being processed.

If the signature comparison indicates that the region is not similar to the previously fetched region, then the required region is fetched from off-chip memory 1204. However, if the signature comparison indicates that the region is similar to the previously fetch region, then the processing will re-use the previously fetched region 1303 (and so the region does not need to be read from main memory, allowing the memory read transaction to be omitted).

As discussed previously (although not shown in FIG. 9), signature-based read transaction elimination can also be used when fetching or reading the layer weights.

Further additional processing steps are present (compared to FIG. 6) when it comes to writing a data array (e.g. an OFM) generated by the layer to memory, in order to provide write-transaction elimination. In particular, if at 1207 it is determined that the OFM is too large to store in the local buffer (such that the OFM would need to be written to main memory), then, as shown in FIG. 9, it is determined whether it is necessary to write blocks (regions) of the OFM to main memory on the basis of a signature comparison.

In particular, after determining that the OFM is too large to be stored in local on-chip memory, a signature is fetched 1304 (from main memory) for a previously stored block of data (region). The previously stored region may comprise a region corresponding to a previous data array, or a different previously stored block of data (region) corresponding to the same (currently processed) data array.

A signature, such as a CRC or hash, etc., is then calculated for the current block of data (region) which is to be written out to memory 1305 and compared to the signature for the previously stored block of data (region). If the signatures of the current region and the previously stored region are not sufficiently similar, then the current block of data (region) is written to the off-chip memory 1208. However, if the signatures of the current region and the previously stored region are sufficiently similar, then it is not necessary to write the current block of data (region) to off-chip memory. If the current region is written to the off-chip memory), then the signature that is generated for the current block of data (region) is written to off-chip memory so that it can be accessed at a later time if needed.

Figure 10:
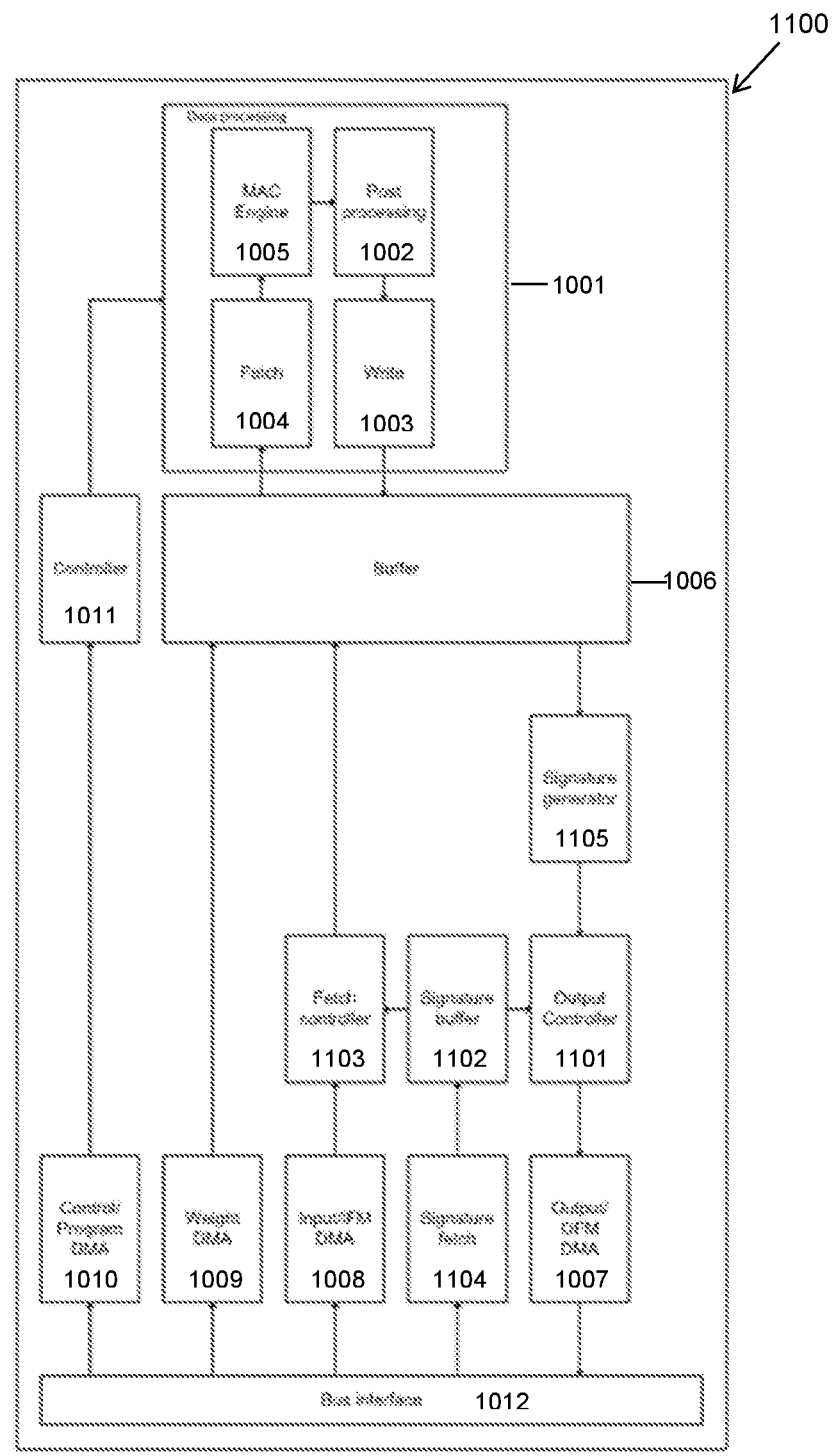
FIG. 10 is a schematic diagram of a data processing system operable to execute a neural network using the transaction elimination of the technology described herein.

FIG. 10 is a schematic diagram of a data processing system 1100 operable to execute a neural network using the transaction elimination of the technology described herein (for example, according to the processing shown in FIG. 9).

FIG. 10 can be contrasted with FIG. 7 (which shows a data processing system that does not use transaction elimination). Compared to FIG. 7, the data processing system 1100 additionally comprises signature generating circuitry 1105 which may be configured to generate a signature for blocks of data that are to be written from the local memory (buffer 1006) to main memory (not shown) via the output/output feature map (OFM) direct memory access DMA unit 1007. The signatures that are generated by the signature generating circuitry 1105 may also be stored in the main memory (as discussed previously).

The data processing system 1100 is be operable to perform write transaction elimination, by deciding whether or not to write a newly generated block of data to main memory based on comparing a signature for the block that is to be written to main memory with a signature representative of the contents of a block of data that is already stored in the main memory. If it is determined that the contents of the newly generated block of data are similar to the contents of the block of data that is already stored in main memory, then the write operation may be omitted. In order to performing the signature comparison, the data processing system 1100 further comprises signature fetch circuitry 1104 which fetches a signature for the block of data that is already in main memory, and writes that signature into a signature buffer 1102. Once the signature is in the signature buffer, an output controller 1101 may perform the signature comparison and determine whether to write the newly generated data block to main memory.

When performing the read transaction elimination, the data processing system 1100 determines whether or not to read a block of data from main memory into local memory for use in neural network processing depending on whether a similar block of data is already present in the local memory (buffer 1006). This is done by comparing a signature for the data block which is to be read from main memory with a signature for a data block that is already stored in the local memory (buffer 1006). When performing this comparison, the signature fetch circuitry 1104 fetches a signature of the data block that is to be read from main memory, and store that signature in the signature buffer 1102. A fetch controller 1103 may then compare the signature that has been fetched into the signature buffer 1102 with a signature for a data block that is currently stored in the local memory along with its respective signature. If the signatures indicate that the data blocks are similar, then the fetch controller 1103 will not fetch data block from the main memory. However, if the signatures indicate that the data blocks differ, then the fetch controller 1103 will fetch the data block from main memory using the input/IFM DMA 1008.

Figure 11:
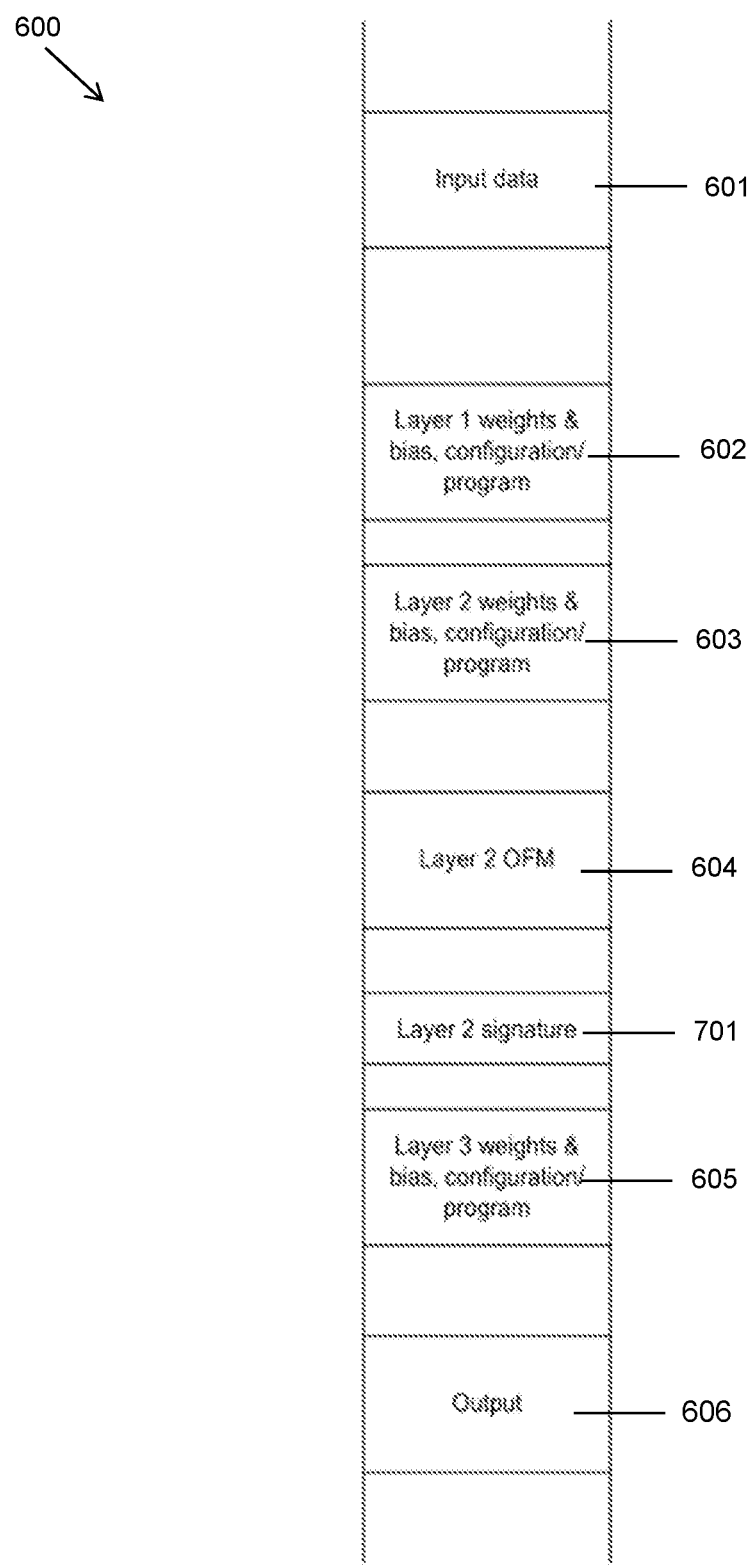
FIG. 11 shows a content of off-chip memory when using the transaction elimination of the technology described herein.

FIG. 11 shows exemplary content of off-chip memory when using the transaction elimination of the technology described herein. The contents of the off-chip memory is similar to that shown in FIG. 8, but also contains signatures 701 for the data array that has been output by Layer 2.

As mentioned with respect to FIG. 8, for the case where Layer 2 has generated a data array (output feature map (OFM) 604) that is too large to store locally, then the OFM 604 will have been stored in the main off-chip memory. However, when transaction elimination has been used, a corresponding signature (or signatures) 701 will have been generated for performing a signature comparison when writing blocks of data for the data array (OFM) to memory. The signatures 701 are stored in the off-chip memory along with the OFM 604.

Figure 12:
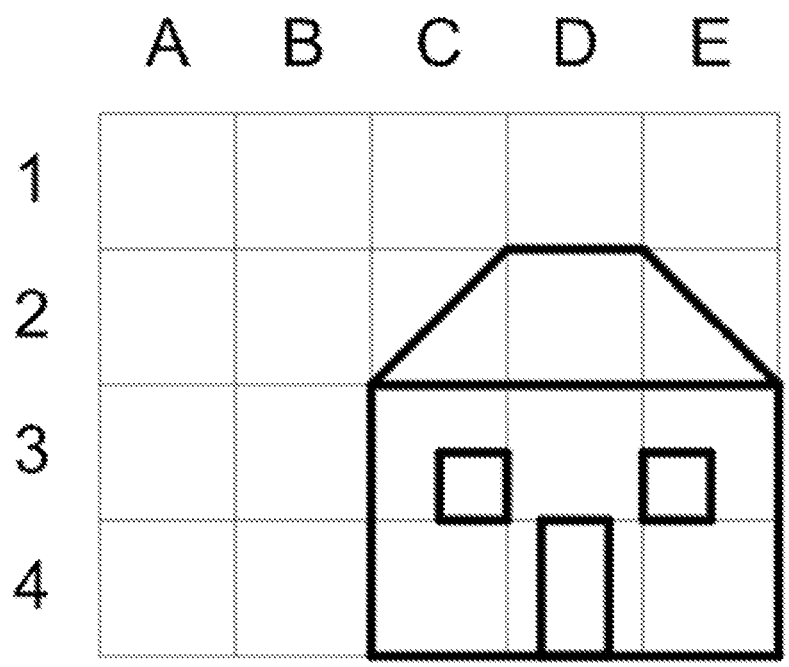
FIG. 12 shows an image on which neural network processing could be performed.

FIG. 12 shows an input data array on which neural network processing could be performed which corresponds to an image. In the present embodiment, the neural network processes the input data array on a block-by-block basis (such that each layer of the neural network processes blocks of data representing regions of the data array which correspond to sub-sections of the input data array, for example, and correspondingly outputs blocks of data). Each block of data may correspond to "tile" of the input image (such as the tiles A1-E4 shown in FIG. 12). However, the regions or tiles need not be the size and shape indicated in FIG. 7. Other sizes and shapes would be suitable.

Furthermore, the input data array for the neural network need not be an image (as shown in FIG. 12), but could also or alternatively comprise sound data or any other suitable input data e.g. received from a suitable sensor.

Figure 13:
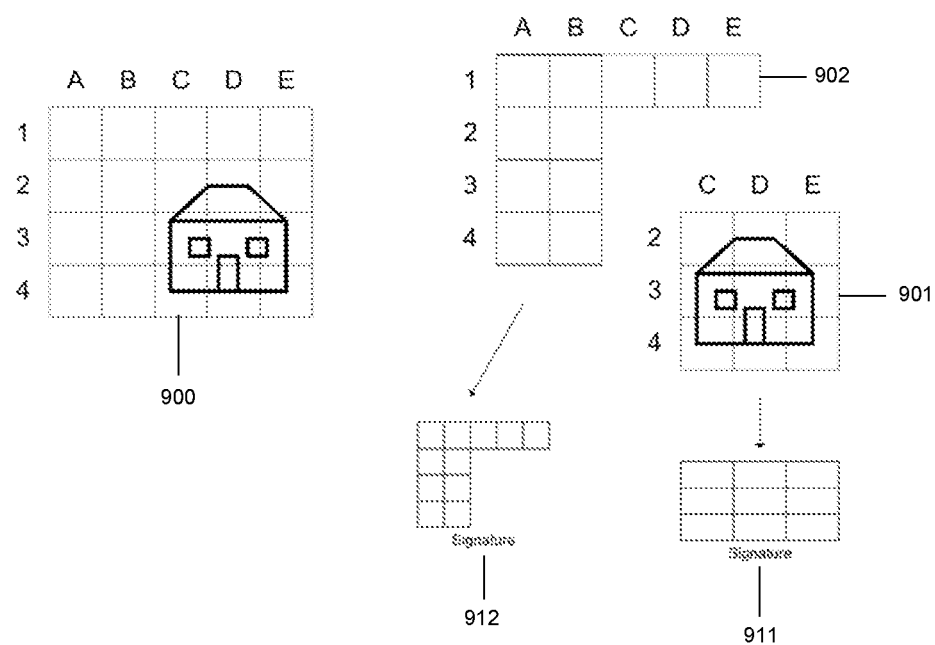
FIG. 13 shows an input data array for a neural network corresponding to an image that contains a region of greater interest and a region of lesser interest.

FIG. 13 shows an input data array 900 for a neural network corresponding to an image that contains an area of greater interest 901 and an area of lesser interest 902.

In the example shown in FIG. 13, the image is divided into a number of tiles A1-E4. The neural network may process the image on a block-by-block basis (as discussed previously), with each block of data representing a region of a data array that corresponds to a tile of the original image shown in FIG. 13.

In FIG. 13, the area of greater interest 901 comprises nine regions (blocks/tiles) of greater interest, which each contain features of interest. The area of lesser interest comprises 902 comprises eleven regions (blocks/tiles) which do not contain features of interest. Alternatively the regions of lesser interest could be identified as those regions containing fewer features of interest, or features of less interest.

When blocks of data generated by the neural network are to be written out to memory, the neural network may generate a signature blocks of data that are to be written out to memory in accordance with the technology described herein. As indicated in FIG. 13, the signature generation process may be varied between different regions (blocks/tiles) of the data array which is to be written out to memory. For instance, the type or complexity of the signature generation may be different for different regions (blocks/tiles) of the data array. More complex signature generation 911 may be used for the regions corresponding to regions of greater interest 901, whilst less complex signature generation 912 may be used for the regions of lesser interest 902. The type of signature generation to be used may be based on the presence of particular values within the region (block/tile), which may be determined, for example, in advance by a host processor or "on-the-fly" by the processor which is executing the neural network (as discussed previously). As discussed previously, the processor may compress blocks of data that are generated by the neural network and that are to be written to memory. The signature generation and comparison may be performed for a block (region/tile) that is to be written to memory prior to compressing the block, such that the compression step can be omitted if it is determined that a sufficiently similar tile is already present in memory.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising a processor operable to execute a neural network, wherein the neural network comprises one or more layers of neural network processing, and memory for storing data relating to the neural network processing being performed by the processor; the method comprising:

when a data array generated by executing a layer of the one or more layers of the neural network processing is to be written to the memory, the processor:
writing the data array generated by executing the layer of the neural network to the memory by writing blocks of data representing particular regions of the data array generated by executing the layer of the neural network to the memory;

the method further comprising the processor:
when a block of data representing a region of the data array generated by executing the layer of the neural network is to be written to memory, generating at least one signature representative of the content of the region of the data array generated by executing the layer of the neural network that the block represents;

comparing the at least one signature for the block of data representing the region of the data array generated by executing the layer of the neural network to at least one signature of a block of a data array that has previously been generated by executing the same layer of the one or more layers of the neural network and is already stored in memory; and determining whether or not to write the block of data representing the region of the data array generated by executing the layer of the neural network to the memory on the basis of the signature comparison;

wherein generating at least one signature representative of the block of data comprises generating a first signature representative one or more of the most significant bits (MSBs) of the data within the block of data, and a second signature representative of one or more of the least significant bits (LSBs) of the data within the block of data;

wherein comparing the at least one signature for the block of data to at least one signature of a block of a data array that is already stored in memory comprises:

comparing the signature representative of one or more of the most significant bits (MSBs) of the data within the block of data that is to be written to memory with a signature representative of one or more of the most significant bits (MSBs) of the data within the block of data already stored in memory; and comparing the signature representative of one or more of the least significant bits (LSBs) of the data within the block of data that is to be written to memory with a signature representative of one or more of the least significant bits (LSBs) of the data within the block of data already stored in memory; and wherein determining whether or not to write the block of data to the memory on the basis of the signature comparison comprises:

when the signatures representative of one or more of the least significant bits (LSBs) are sufficiently similar and the signatures representative of one or more of the most significant bits (MSBs) are sufficiently similar, determining that the block of data should not be written to memory;

when the signatures representative of one or more of the most significant bits (MSBs) are sufficiently similar, but the signatures representative of one or more of the least significant bits (LSBs) are not sufficiently similar, either:

writing out to memory data representative of the data used to generate the signature representative of one or more of the least significant bits (LSBs); or not writing out any part of the block of data to memory.

2. The method of claim 1, comprising, when it is determined that the block of data should be written to memory, also storing the signature for the block of data in memory.

3. The method of claim 1, wherein the data processing system further comprises second memory for storing data to be used by the processor when executing the neural network, and the method further comprises:

when a block of data that had been written to the memory is required by the processor for executing the neural network, determining whether to read the block of data into the second memory for use by the processor by:

comparing at least one signature that was generated for the block of data that had been written to the memory and that is required by the processor to at least one signature representative of the content of a block of data that is already stored in the second memory; and determining whether to read the block of data from the memory into second memory on the basis of the signature comparison.

4. The method of claim 1, wherein the data array that is to be written to or read from memory comprises a feature map generated by executing a layer of the neural network, a weight data array that sets parameters for neural network processing, or an input data array for the neural network processing.

5. The method of claim 1, further comprising, after it has been determined based on the signature comparison that a block of data should be written to memory, the processor compressing the block of data before the block of data is written to memory, and then writing the compressed block of data to the memory.

6. The method claim 1, comprising, when a block of data is to be written to memory, selecting one of a plurality of different signature generation processes, and generating a signature for the block using the selected signature generation process.

7. The method of claim 6, wherein the signature generation process for the block of data is selected based on at least one of: the content of the region of the data array represented by the block of data; a user input; data relating to a user's interaction with data array;

or data from user eye or head tracking.

8. A method of operating a data processing system, the data processing system comprising a processor operable to execute a neural network wherein the neural network comprises one or more layers of neural network processing, a first memory and a second memory for storing data relating to the neural network processing being performed by the processor, wherein the processor is operable to load data from the first memory into the second memory and to execute the neural network using data that is stored in the second memory, the method comprising:

when a block of data representing a region of a data array that is stored in the first memory is required by the processor for executing a layer of the one or more layers of the neural network, determining whether to read the block of data from the first memory into the second memory by:

comparing at least one signature representative of the content of the block of data stored in the first memory that is required for executing the layer of the neural network to at least one signature representative of the content of a block of data required previously for executing the same layer of the one or more layers of the neural network that is already stored in the second memory; and determining whether to read the block of data from the first memory into second memory on the basis of the signature comparison;

wherein generating at least one signature representative of the block of data comprises generating a first signature representative one or more of the most significant bits (MSBs) of the data within the block of data, and a second signature representative of one or more of the least significant bits (LSBs) of the data within the block of data;

wherein comparing the at least one signature for the block of data to at least one signature of a block of a data array that is already stored in the second memory comprises:

comparing the signature representative of one or more of the most significant bits (MSBs) of the data within the block of data that is to be read from the first memory with a signature representative of one or more of the most significant bits (MSBs) of the data within the block of data already stored in second memory; and comparing the signature representative of one or more of the least significant bits (LSBs) of the data within the block of data that is to be read from the first memory with a signature representative of one or more of the least significant bits (LSBs) of the data within the block of data already stored in the second memory; and wherein determining whether or not to read the block of data from the first memory into the second memory on the basis of the signature comparison comprises:

when the signatures representative of one or more of the least significant bits (LSBs) are sufficiently similar and the signatures representative of one or more of the most significant bits (MSBs) are sufficiently similar, determining that the block of data should not be read from the first memory into the second memory;

when the signatures representative of one or more of the most significant bits (MSBs) are sufficiently similar, but the signatures representative of one or more of the least significant bits (LSBs) are not sufficiently similar, either:

reading from the first memory into the second memory data representative of the data used to generate the signature representative of one or more of the least significant bits (LSBs); or not reading any part of the block of data from the first memory into the second memory.

9. A data processing system, comprising:

a processor operable to execute a neural network, wherein the neural network comprises one or more layers of neural network processing; and memory for storing data relating to neural network processing being performed by the processor;

wherein the processor is operable to, when a data array generated by executing a layer of the one or more layers of the neural network processing is to be written to the memory, write the data array generated by executing the layer of the neural network to the memory by writing blocks of data representing particular regions of the data array generated by executing the layer of the neural network to the memory; and the processor further comprising:

signature generating circuitry operable to generate, for a block of data representing a region of the data array generated by executing a layer of the one or more layers of the neural network which is to be written to the memory, at least one signature representative of the content of the region of the data array generated by executing the layer of the neural network that the block represents;

comparison circuitry which is operable to, when a block of data representing a region of the data array generated by executing a layer of one or more layers of the neural network is to be written to memory:

compare at least one signature representative of the content of the region that the block of data generated by executing the layer of the neural network represents to at least one signature representative of the content of a region that a block of a data array previously generated by executing the same layer of the neural network that is already stored in memory represents; and determine whether or not to write the block of data generated by executing the layer of the neural network to the memory on the basis of the signature comparison;

wherein the signature generating circuitry is operable to generate a first signature representative of one or more of the most significant bits (MSBs) of the data within a block of data, and a second signature representative of one or more of the least significant bits (LSBs) of the data within a block of data;

the comparison circuitry is configured to:

compare a signature representative of one or more of the most significant bits (MSBs) of the data within a block of data that is to be written to memory with a signature representative of one or more of the most significant bits (MSBs) of the data within a block of data already stored in memory; and compare a signature representative of one or more of the least significant bits (LSBs) of the data within a block of data that is to be written to memory with a signature representative of one or more of the least significant bits (LSBs) of the data within the block of data already stored in memory; and wherein the comparison circuitry is configured to:

determine whether the signatures representative of the one or more of the least significant bits (LSBs) are sufficiently similar and whether the signatures representative of one or more of the most significant bits (MSBs) are sufficiently similar; and when it is determined that the signatures representative of the one or more of the least significant bits (LSBs) are sufficiently similar and the signatures representative of the one or more of the most significant bits (MSBs) are sufficiently similar, determine that the block of data should not be written to memory; and when it is determined that the signatures representative of the one or more of the most significant bits (MSBs) are sufficiently similar, but the signatures representative of the one or more of the least significant bits (LSBs) are not sufficiently similar, then either:

cause the processor to write to memory data representative of the data used to generate the signature representative of the one or more of the least significant bits (LSBs); or cause the processor to not write to memory the one or more of the most significant bits (MSBs) and the one or more of the least significant bits (LSBs) of the block of data.

10. The data processing system of claim 9, wherein the processor is operable to, when it is determined that a block of data should be written to memory, also store a signature for the block of data in memory.

11. The data processing system of claim 9 further comprising:

second memory for storing data to be used by the processor when executing a neural network;

wherein a data array to be used by the processor when executing a neural network is first read from memory to the second memory by loading blocks of data representing particular regions of the data array into the second memory before the data array is used by the processor; and wherein the processor is operable to execute the neural network using data from blocks of data stored in the second memory;

wherein the comparison circuitry is further operable to, when a block of data of a data array is required by the processor for executing a neural network, determine whether to read the block of data into the second memory for use by the processor by:

comparing at least one signature representative of the contents of the region of the data array that the block of data represents to at least one signature representative of the content of a block of data that is already stored in the second memory; and determining whether to read the block of data from the memory into the second memory on the basis of the signature comparison.

12. The data processing system of claim 9, wherein:
the processor is operable to execute a neural network comprising at least one layer for performing network processing; and
wherein the data array that is to be written to or read from memory comprises a data array generated by or required by a layer of the neural network.

13. The data processing system of claim 9, wherein the data array that is to be written to or read from memory comprises a feature map generated by executing a layer of the neural network, a weight data array that sets parameters for neural network processing, or an input data array for the neural network processing.

14. The data processing system of claim 9, wherein the processor further comprises:
compression circuitry operable to, after it has been determined by the comparison circuitry that a block of data should be written to memory, before the block of data is written to memory, compress the block of data so that the compressed block of data can then be written to memory.

15. The data processing system of claim 6, wherein the signature generating circuitry is operable to select one of a plurality of different signature generation processes for generating a signature for a block of data.

16. The data processing system of claim 15, wherein the signature generating circuitry is operable to select a signature generation process for a block of data for which a signature is to be generated based on at least one of: the content of that block of data; a user input; data relating to a user's interaction with the data array; or data from user eye or head tracking.

17. A data processing system, comprising:
a processor operable to execute a neural network, wherein the neural network comprises one or more layers of neural network processing; and
first and second memory for storing data to be used by the processor when executing a neural network;
wherein the processor is operable to load blocks of data representing regions of a data array required for executing a layer of the one or more layers of the neural network from the first memory into the second memory, and to execute the neural network using blocks of data that are stored in the second memory;
the data processing system further comprising comparison circuitry which is operable to, when a block of data representing a region of a data array that is stored in the first memory is required by the processor for executing a layer of the one or more layers of the neural network, determine whether to read the block of data from the first memory into the second memory by:
comparing at least one signature representative of the block of data stored in the first memory that is required for executing the layer of the neural network to at least one signature representative of a region of a data array that was previously required for executing the same layer of the neural network and is already stored in the second memory; and
determining whether to read the block of data from the first memory into second memory on the basis of the comparison
wherein the signature generating circuitry is operable to generate a first signature representative of one or more of the most significant bits (MSBs) of the data within a block of data, and a second signature representative of one or more of the least significant bits (LSBs) of the data within a block of data;

the comparison circuitry is configured to:
compare a signature representative of one or more of the most significant bits (MSBs) of the data within a block of data that is to be read from the first memory into the second memory with a signature representative of one or more of the most significant bits (MSBs) of the data within a block of data already stored in the second memory; and
compare a signature representative of one or more of the least significant bits (LSBs) of the data within a block of data that is to be read from the first memory into the second memory with a signature representative of one or more of the least significant bits (LSBs) of the data within the block of data already stored in the second memory; and wherein the comparison circuitry is operable to:
determine whether the signatures representative of the one or more of the least significant bits (LSBs) are sufficiently similar and whether the signatures representative of one or more of the most significant bits (MSBs) are sufficiently similar; and
when it is determined that the signatures representative of the one or more of the least significant bits (LSBs) are sufficiently similar and the signatures representative of the one or more of the most significant bits (MSBs) are sufficiently similar, determine that the block of data should not be read from the first memory into the second memory; and
when it is determined that the signatures representative of the one or more of the most significant bits (MSBs) are sufficiently similar, but the signatures representative of the one or more of the least significant bits (LSBs) are not sufficiently similar, then either:
cause the processor to read from the first memory into the second memory data representative of the data used to generate the signature representative of the one or more of the least significant bits (LSBs); or
cause the processor to not read from the first memory into the second memory the one or more of the most significant bits (MSBs) and the one or more of the least significant bits (LSBs) of the block of data.

18. A computer readable storage medium storing computer software code which when executing on a processor performs a method of operating a data processing system, the data processing system comprising a processor operable to execute a neural network wherein the neural network comprises one or more layers of neural network processing, and memory for storing data relating to the neural network processing being performed by the processor; the method comprising:
when a data array generated by executing a layer of the one or more layers of the neural network processing is to be written to the memory, the processor:
writing the data array generated by executing the layer of the neural network to the memory by writing blocks of data representing particular regions of the data array generated by executing the layer of the neural network to the memory;
the method further comprising the processor:
when a block of data representing a region of the data array generated by executing the layer of the neural network is to be written to memory, generating at least one signature representative of the content of the region of the data array generated by executing the layer of the neural network that the block represents;
comparing the at least one signature for the block of data representing the region of the data array generated by executing the layer of the neural network to a signature of a block of a data array that has previously been generated by executing the same layer of the one or more layers of the neural network and is already stored in memory; and
determining whether or not to write the block of data representing the region of the data array generated by executing the layer of the neural network to the memory on the basis of the signature comparison;
wherein generating at least one signature representative of the block of data comprises generating a first signature representative one or more of the most significant bits (MSBs) of the data within the block of data, and a second signature representative of one or more of the least significant bits (LSBs) of the data within the block of data;
wherein comparing the at least one signature for the block of data to at least one signature of a block of a data array that is already stored in memory comprises:
comparing the signature representative of one or more of the most significant bits (MSBs) of the data within the block of data that is to be written to memory with a signature representative of one or more of the most significant bits (MSBs) of the data within the block of data already stored in memory; and
comparing the signature representative of one or more of the least significant bits (LSBs) of the data within the block of data that is to be written to memory with a signature representative of one or more of the least significant bits (LSBs) of the data within the block of data already stored in memory; and
wherein determining whether or not to write the block of data to the memory on the basis of the signature comparison comprises:
when the signatures representative of one or more of the least significant bits (LSBs) are sufficiently similar and the signatures representative of one or more of the most significant bits (MSBs) are sufficiently similar, determining that the block of data should not be written to memory;
when the signatures representative of one or more of the most significant bits (MSBs) are sufficiently similar, but the signatures representative of one or more of the least significant bits (LSBs) are not sufficiently similar, either:
writing out to memory data representative of the data used to generate the signature representative of one or more of the least significant bits (LSBs); or
not writing out any part of the block of data to memory.

* * * * *